US012198711B2

(12) United States Patent
Stone et al.

(10) Patent No.: US 12,198,711 B2
(45) Date of Patent: Jan. 14, 2025

(54) METHODS AND SYSTEMS FOR PROCESSING RECORDED AUDIO CONTENT TO ENHANCE SPEECH

(71) Applicant: Cyber Resonance Corporation, Irvine, CA (US)

(72) Inventors: Troy Christopher Stone, Orlando, FL (US); Wayne Roy Lappi, Irvine, CA (US)

(73) Assignee: Cyber Resonance Corporation, Irvine, CA (US)

( * ) Notice: Subject to any disclaimer, the term of this patent is extended or adjusted under 35 U.S.C. 154(b) by 574 days.

(21) Appl. No.: 17/455,874

(22) Filed: Nov. 19, 2021

(65) Prior Publication Data

US 2022/0165289 A1 May 26, 2022

Related U.S. Application Data

(60) Provisional application No. 63/117,051, filed on Nov. 23, 2020.

(51) Int. Cl.
*G10L 21/0324* (2013.01)
*G10L 25/51* (2013.01)

(52) U.S. Cl.
CPC .......... *G10L 21/0324* (2013.01); *G10L 25/51* (2013.01)

(58) Field of Classification Search
CPC ............................ G10L 21/0324; G10L 25/51
See application file for complete search history.

(56) References Cited

U.S. PATENT DOCUMENTS

| | | | |
|---|---|---|---|
| 3,879,724 | A | 4/1975 | McDonald |
| 5,210,820 | A | 5/1993 | Kenyon |
| 5,343,251 | A | 8/1994 | Nafeh |

(Continued)

FOREIGN PATENT DOCUMENTS

| | | |
|---|---|---|
| CN | 1835073 | 9/2006 |
| EP | 1006685 | 6/2000 |

(Continued)

OTHER PUBLICATIONS

U.S. Appl. No. 14/313,911, filed Jun. 24, 2014, Stone et al.

(Continued)

*Primary Examiner* — Hai Phan
*Assistant Examiner* — Alvin Iskender
(74) *Attorney, Agent, or Firm* — Knobbe, Martens, Olson & Bear LLP

(57) ABSTRACT

Methods and systems are disclosed configured to perform automated volume leveling on speech content in an audio file containing speech and non-speech segments. A low pass filter and a high pass filter may be applied to the audio data, and normalization may be performed. Speech and non-speech segments may be detected. Gain adjustments may be made to achieve a substantially constant short term loudness. Processing may be applied to enhance speech parameters, such as attack and release. An upward expander may be used to achieve a target loudness level. A limited and/or dynamic range compressor may be utilized to satisfy true peak and/or short term loudness specifications. A file of processed audio data may be generated and transmitted to one or more destinations for broadcast and/or streaming.

28 Claims, 14 Drawing Sheets

(56) References Cited

U.S. PATENT DOCUMENTS

| | | | | |
|---|---|---|---|---|
| 5,436,653 | A | 7/1995 | Ellis et al. | |
| 5,737,716 | A | 4/1998 | Bergstrom et al. | |
| 5,903,482 | A * | 5/1999 | Iwamura | G06F 17/17 708/313 |
| 5,918,223 | A | 6/1999 | Blum et al. | |
| 6,292,776 | B1 | 9/2001 | Chengalvarayan | |
| 6,529,809 | B1 | 3/2003 | Breed et al. | |
| 6,597,405 | B1 | 7/2003 | Iggulden | |
| 7,299,050 | B2 | 11/2007 | Delaney et al. | |
| 8,249,872 | B2 | 8/2012 | Aronowitz et al. | |
| 8,369,532 | B2 | 2/2013 | Aarts | |
| 8,396,705 | B2 | 3/2013 | Bilobrov | |
| 8,825,188 | B2 | 9/2014 | Stone et al. | |
| 8,918,316 | B2 | 12/2014 | Ben et al. | |
| 8,925,024 | B2 | 12/2014 | Wright et al. | |
| 9,653,094 | B2 | 5/2017 | Stone et al. | |
| 10,355,657 | B1 * | 7/2019 | Skovenborg | H04R 3/00 |
| 2002/0133499 | A1 | 9/2002 | Ward et al. | |
| 2002/0176702 | A1 | 11/2002 | Frantz | |
| 2006/0196337 | A1 | 9/2006 | Breebart et al. | |
| 2006/0229878 | A1 | 10/2006 | Scheirer | |
| 2007/0288952 | A1 | 12/2007 | Weinblatt | |
| 2008/0103761 | A1 | 5/2008 | Printz | |
| 2008/0127244 | A1 | 5/2008 | Zhang | |
| 2008/0235011 | A1 * | 9/2008 | Archibald | G10L 25/78 704/E21.001 |
| 2009/0220109 | A1 | 9/2009 | Crockett | |
| 2009/0299750 | A1 | 12/2009 | Yonekubo | |
| 2010/0195972 | A1 | 8/2010 | Casagrande | |
| 2010/0274554 | A1 | 10/2010 | Orr | |
| 2013/0259211 | A1 | 10/2013 | Vlack et al. | |
| 2014/0313911 | A1 | 6/2014 | Stone et al. | |
| 2016/0088160 | A1 | 3/2016 | Tan | |
| 2018/0277107 | A1 * | 9/2018 | Kim | G10L 15/22 |
| 2019/0334497 | A1 * | 10/2019 | Wang | H03G 3/32 |

FOREIGN PATENT DOCUMENTS

| | | | | |
|---|---|---|---|---|
| EP | 1341310 | | 9/2003 | |
| EP | 2353237 | | 8/2011 | |
| EP | 1730105 | | 1/2012 | |
| WO | WO-2007127023 | A1 * | 11/2007 | G10L 21/038 |
| WO | WO 2013/184520 | | 12/2013 | |
| WO | WO 2014 082812 | A1 | 6/2014 | |
| WO | WO 2016/172363 | A1 | 10/2016 | |
| WO | WO-2018177787 | A1 * | 10/2018 | G10L 19/167 |

OTHER PUBLICATIONS

U.S. Appl. No. 15/496,330, filed Apr. 25, 2017, Stone et al.
U.S. Appl. No. 17/455,874, filed Nov. 19, 2021, Stone et al.
Andersson, Tobias, Audio classification and content description, Audio Processing & Transport Multimedia Technologies Ericsson Research, Lulea, Sweden, Mar. 2004; ISSN: 1402-1617.
Biernacki, "Intelligent System for Commercial Block Recognition Using Audio Signal Only," Knowledge-Based and Intelligent Information and Engineering Systems, LNCS 6276 (Proceedings of The 14th International Conference on KES 2010, Part I), pp. 360-368, Sep. 8-10, 2010.
Doets et al., "Distortion Estimation in Compressed Music Using Only Audio Fingerprints", Feb. 2008, IEEE Transactions on Audio, Speech, and Language Processing, vol. 16, No. 2, pp. 302-317.
Giannakopoulos, T. et al., Introduction to Audio Analysis, A Matlab Approach, First Edition, 2014.
Haitsma et al., "A Highly Robust Audio Fingerprinting System", 2002, IRCAM, pp. 1-9.
International Search Report and Written Opinion, PCT/US2013/043737, mailed Sep. 16, 2013, 11 pages.
Kopparapu et al., "Choice of Mel Filter Bank in Computing MFCC of a Resampled Speech," In: The 10th International Conference on Information Sciences Signal Processing and their Applications (ISSPA 2010), pp. 121-124, May 10-13, 2010.
PCT International Search Report and Written Opinion dated Jul. 28, 2016, Application No. PCT/US2016/028682, 7 pages.

* cited by examiner

100

Example of leveling to reach the interim target audio level at change points

*Note: the audio waveform represents the audio prior to any leveling*

506

Broadcast ATSC/A85 example
Audio Speech Segment Leveler with max 26dB gain

506

Broadcast ATSC/A85 example
Upward Expander with max 12dB Gain

507

Broadcast ATSC/A85 example
Compressor with max -4dB Gain reduction

508

Broadcast ATSC/A85 example
Limiter with max -5dB Gain

509

METHODS AND SYSTEMS FOR PROCESSING RECORDED AUDIO CONTENT TO ENHANCE SPEECH

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field of the Invention

The present disclosure generally relates to audio content processing, and in particular, to methods and systems for adjusting the volume levels of speech in media files.

Description of the Related Art

Conventional approaches for leveling speech in media files have proven deficient. For example, certain conventional techniques for leveling speech are time consuming, highly manual, and require the expert technical knowledge of audio professionals. Certain other existing techniques often change the level of the audio at the wrong time and place, thereby failing to retain the emotion and human characteristics of the speaker.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a system comprising: at least one processing device operable to: receive audio data; receive an identification of specified deliverables; access metadata corresponding to the specified deliverables, the metadata specifying target parameters including at least specified target loudness parameters for the specified deliverables; normalize an audio level of the audio data to a first specified target level using a corresponding gain to provide normalized audio data; perform loudness measurements on the normalized audio data; obtain a probability that speech audio is present in a given portion of the normalized audio data and identify a corresponding time duration; determine if the probability of speech being present within the given portion of the normalized audio data satisfies a first threshold; at least partly in response to determining that the probability of speech being present within the given portion of the normalized audio data satisfies the first threshold and that the corresponding time duration satisfies a second threshold, associating a speech indicator with the given portion of the normalized audio data; based at least in part on the loudness measurements, associate a given portion of the normalized audio data with a pair of change point indicators that indicate a short term change in loudness that satisfies a third threshold, the pair of change point indicators defining an audio segment; determine a gain needed to reach an interim target audio level for the given audio segment associated with the speech indicator; use the determined gain needed to reach the interim target audio level to perform volume leveling on the given audio segment to thereby provide a volume-leveled given audio segment; use one or more dynamics audio processors to process the volume-leveled given audio segment to satisfy one or more of the target parameters, including at least a specified target loudness parameter.

An aspect of the present disclosure relates to a computer implemented method comprising: accessing audio data; receiving an identification of specified deliverables; accessing metadata corresponding to the specified deliverables, the metadata specifying target parameters including at least specified target loudness parameters; performing loudness measurements on the audio data; obtaining a likelihood that speech audio is present in a given portion of the audio data and identify a corresponding time duration; determining if the likelihood of speech being present within the given portion of the audio data satisfies a first threshold; at least partly in response to determining that the likelihood of speech being present within the given portion of the audio data satisfies the first threshold and that the corresponding time duration satisfies a second threshold, associating a speech indicator with the given portion of the audio data; based at least in part on the loudness measurements, associating a given portion of the audio data with a pair of change point indicators that indicate a short term change in loudness that satisfies a third threshold, the pair of change point indicators defining an audio segment; determining a gain needed to reach an interim target audio level for the given audio segment associated with the speech indicator; using the determined gain needed to reach the interim target audio level to perform volume leveling on the given audio segment to thereby provide a volume-leveled given audio segment; using one or more dynamics audio processors to process the volume-leveled given audio segment to satisfy one or more of the target parameters, including at least a specified target loudness parameter; generating a file comprising audio data processed to satisfy one or more of the target parameters; and providing the file generated using the processed audio data to one or more destinations.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1:
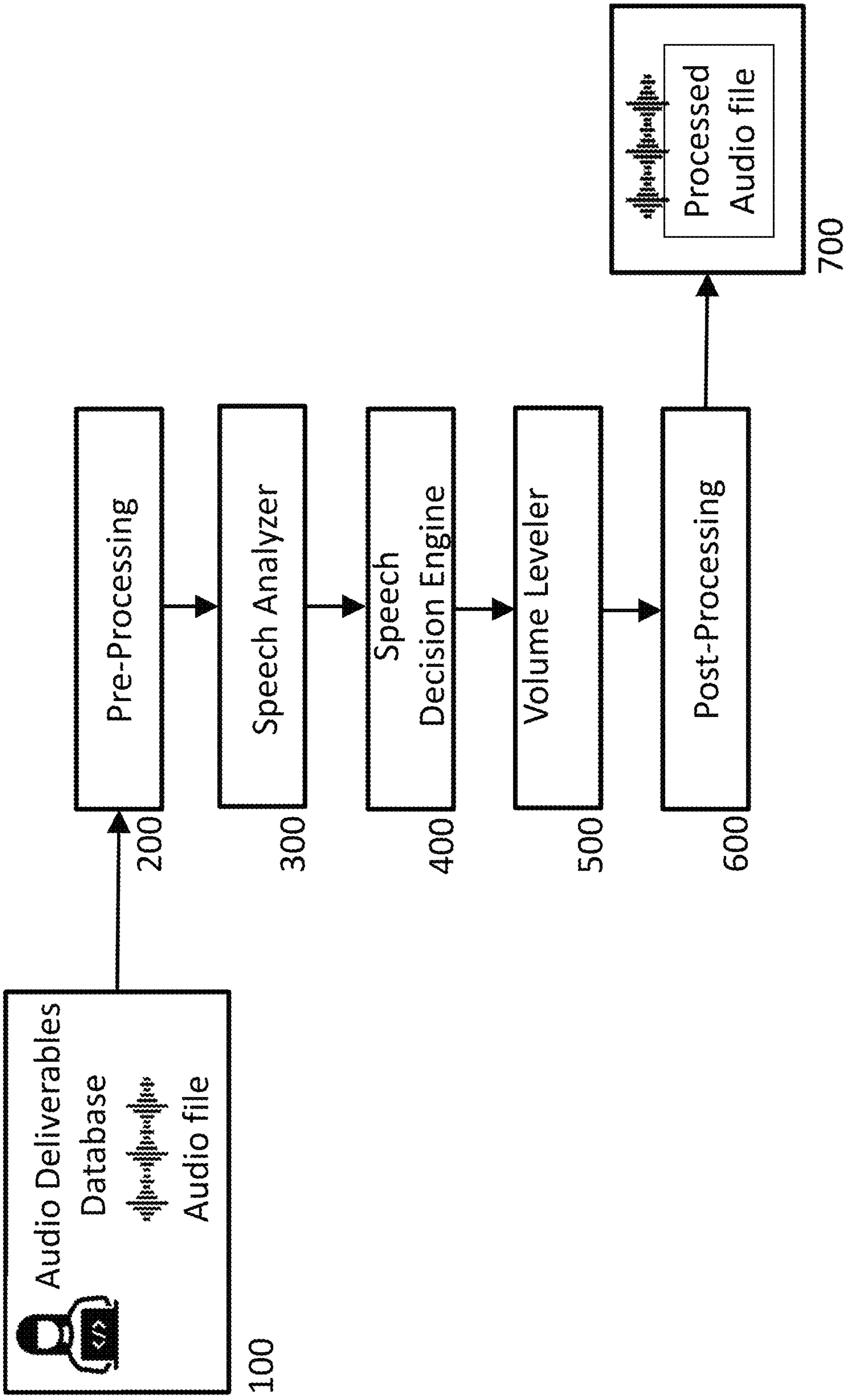
FIG. 1 illustrates a system overview diagram of an example audio processing system.

The following description is presented to enable any person skilled in the art to make and use the apparatus and is provided in the context of particular applications of the apparatus and their requirements. Various modifications to the disclosed embodiments will be readily apparent to those skilled in the art and the general principles defined herein may be applied to other embodiments and applications without departing from the scope of the present apparatus. Thus, the present apparatus is not intended to be limited to the embodiments shown but is to be accorded the widest scope consistent with the principles and features disclosed herein.

Conventional methods for leveling speech in media files are time consuming, slow, inaccurate, and have proven deficient. For example, using one conventional approach users identify audio leveling problems in real-time by listening to audio files and watching the feedback from various types of meters. After an audio leveling problem is identified, the user needs to determine how to correct the audio leveling problem. One conventional approach uses an audio editing software application graphical user interface that requires the user to "draw" in the required volume changes by hand with a pointing device, a tedious, inaccurate, and time-consuming task.

Other conventional methods (often used in combination with the foregoing "drawing" approach), utilize various types of dynamic range processors (DRPs.). One critical problem with DRPs is that DRPs are generally configured for music or singing and so perform poorly on recorded speech whose signals vary both in dynamic range and amplitude. Even those DRPs configured to perform audio leveling specifically for speech are often deficient when it comes to sound quality, and are unable to retain the emotional character of the speaker; often increasing the volume decreasing the volume in the middle of words and at the wrong times.

Other conventional methods employ audio normalizers and loudness processors that utilize an integrated target value and thus fail to level speech at the right times or miss entirely during short term and momentary speech fluctuations. Thus, conventional techniques for leveling speech are time consuming, highly manual, inaccurate, and require expert knowledge from users who are rarely audio professionals. Conventional techniques often change the level of the audio at the wrong time or by an incorrect amount; failing to retain the emotion and human characteristics of the speaker.

Audio postproduction tasks are conventionally mostly a manual process with all inaccuracies and deficient associated with manual approaches. Non-linear editing software, digital audio workstations, audio hardware and plugins have brought certain improvements in sonic quality and speed, but fail to adequately automate tasks, are tedious to utilize, and require trial and error in attempting to obtain a desired result.

When it comes to audio leveling for dialogue and speech, users currently have several conventional options to choose from, many of which have a common theme of needing manual intervention, such as drawing volume automation by hand, clip-based audio gain, audio normalization and various dynamic range processors including automatic gain control, compressors, and limiters.

Conventional automated speech leveling solutions may, add noise, increase the volume of breaths and mouth clicks, miss short, long, and momentary volume fluctuations altogether, destroy dynamic range, sound unnatural, turn up or turn down speech volume at the wrong times, compress speech may sound so that it sounds lifeless, and may produce an audible pumping effect.

Additionally, conventional speech leveling solutions may require users to choose the dynamic range needed and target loudness values, set several parameters manually and have a vast understanding of advanced audio concepts. Further, conventional speech leveling systems generally focus on meeting the integrated loudness target but may miss the short time, short time max and momentary loudness specifications completely. Further, conventional speech leveling systems may not produce a final deliverable audio file at the proper audio codec and channel format.

In order to solve some or all of the technical deficiencies of conventional techniques, disclosed are methods and systems configured to automate leveling speech, while meeting loudness and delivery file formats. Such an example system and process are illustrated in FIG. 1. The audio may be audio associated with a video file, a stand-alone audio file, streaming audio, an audio channel associated with streaming video, or may be from other sources.

In a first aspect of the present disclosure there is provided a method for automating various types of audio related tasks associated with volume leveling, audio loudness, audio dithering and audio file formatting. Such tasks may be performed in batch mode, where several audio records may be analyzed and processed in non-real time (e.g., when loading is otherwise relatively light for processing systems).

According to an embodiment of the first aspect, an analysis apparatus is configured to perform analysis tasks, including extracting audio loudness statistics, detecting loudness peaks, detecting speech (e.g., spoken words by one or more people) and classifying audio content (e.g., into speech and non-speech content audio types, and optionally into still additional categories).

By way of example, the systems and methods described herein may be configured to determine when and how much gain to apply to an audio signal.

Figure 3:
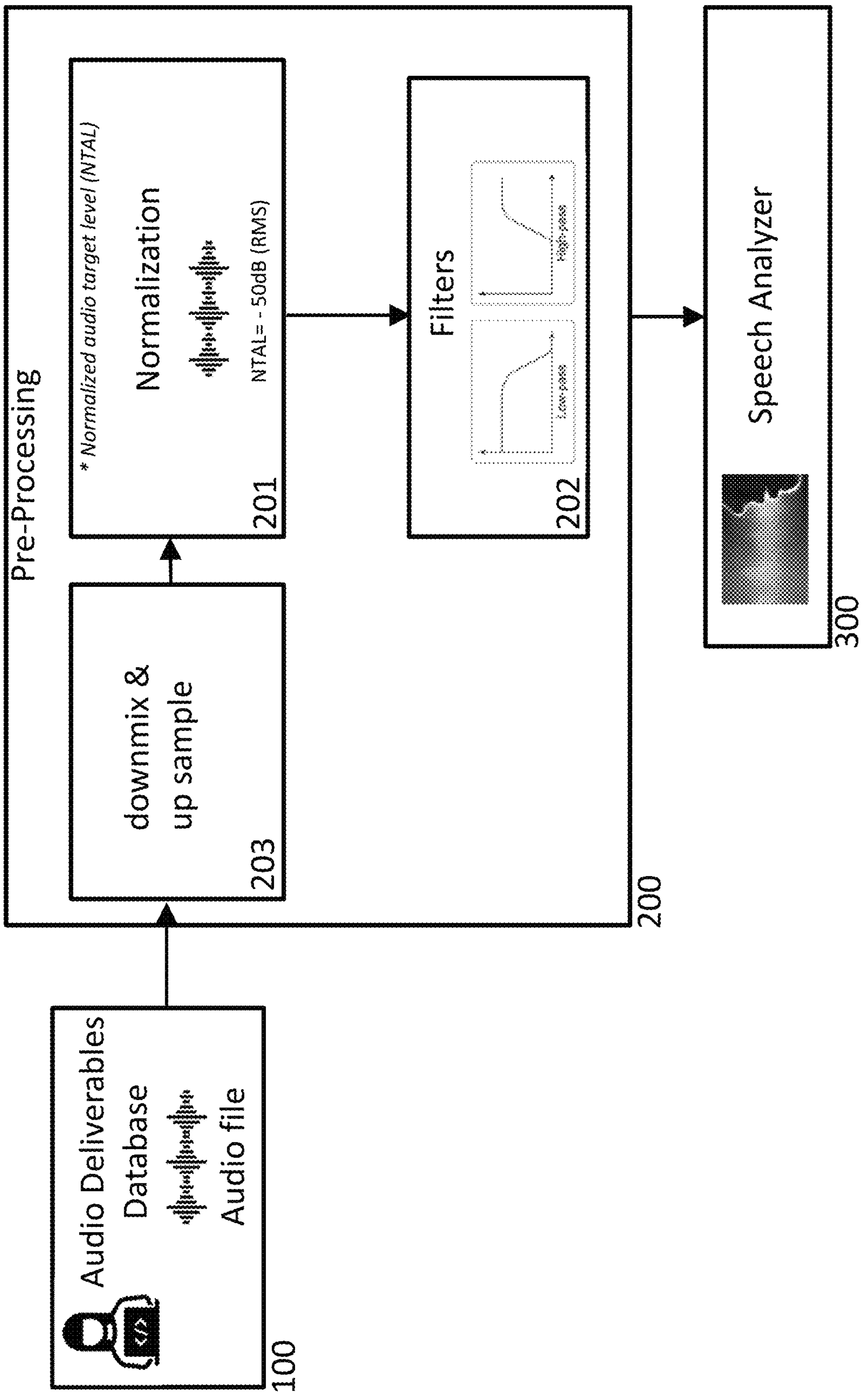
FIG. 3 illustrates an example system and process configured to perform audio pre-processing.
Figure 4:
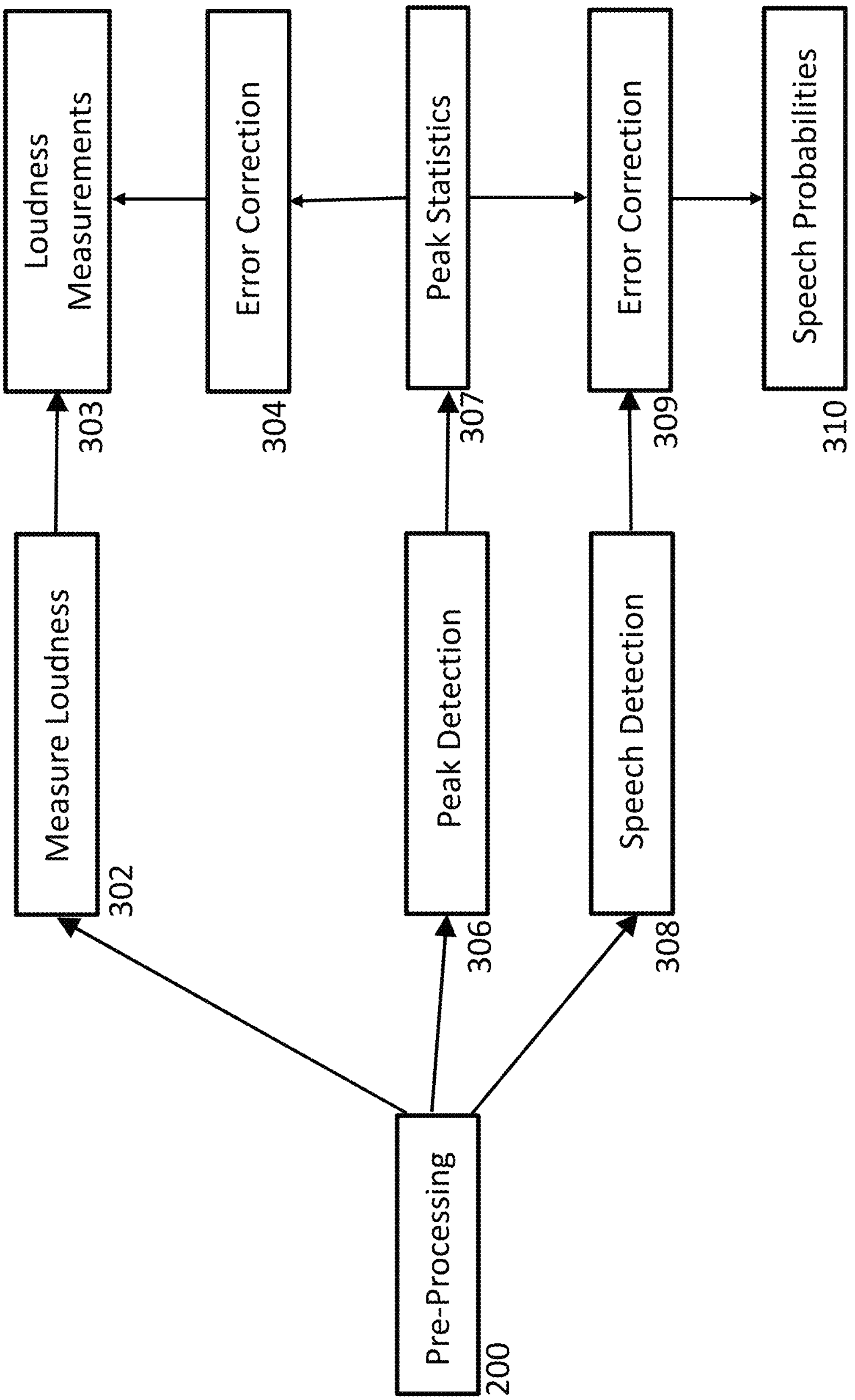
FIG. 4 illustrates an example audio speech analyzer process.

With reference to FIGS. 1, 3, and 4, an audio processing system input may be configured to receive audio files, which may optionally be from the audio deliverables database 100 comprising digital audio data. The system may further be configured for frame-based processing. The audio processing system may provide an automated, efficient, and accurate method for leveling the volume of speech audio content. The system may further be configured to meet audio loudness standards (e.g., to ensure that the audio meets audio deliverable requirements or specifications).

A system may be configured to receive audio loudness information and audio file format information from an audio deliverables database 100. The audio deliverables database 100 may optionally be classified by distributor, platform, and/or various audio loudness standards.

Figure 10:
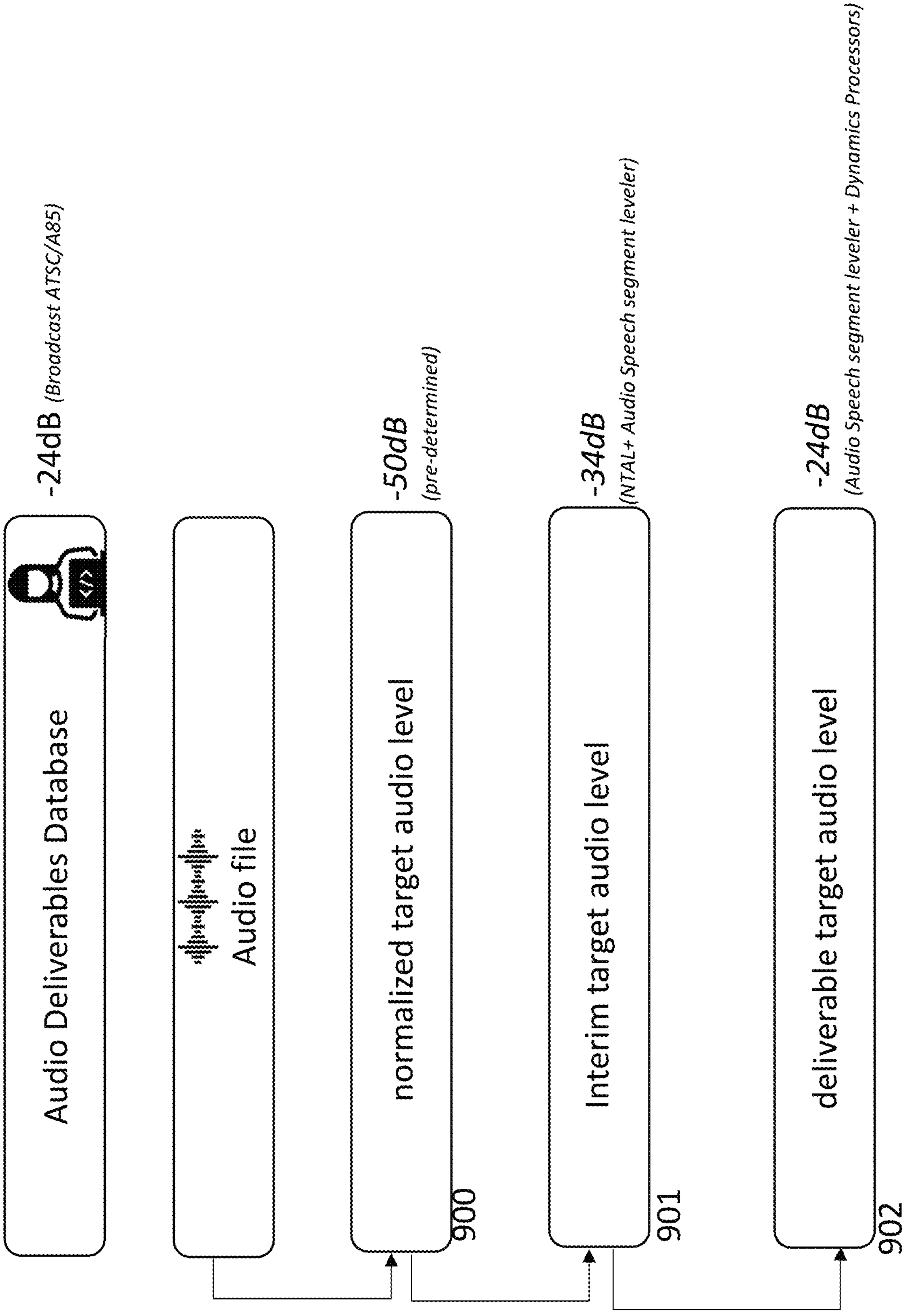
FIG. 10 illustrates example stages of audio targets.

With reference to FIG. 10, a system may determine one or more other target audio levels (which may comprise integrated loudness (e.g., RMS loudness), short time loudness, momentary levels and, and/or true peak levels), prior to the deliverable target audio level 902. A determined normalized target audio level 900 may further reduce system errors, and a determined interim target audio level 901 may enable dynamics audio processors threshold values to be in a desired range more often than they would have otherwise.

With reference to FIGS. 3 and 4, a pre-processing system 200 may be configured to normalize, using the normalization function 201, one or more audio files to a constant volume level, sometimes referred to herein as the normalized target audio level (NTAL). The pre-processing system 200 may calculate the volume RMS of the initial audio file to determine the gain needed to reach the NTAL. A further aspect of the calculation identifies and excludes near silence and silence from the measurement.

Figure 5:
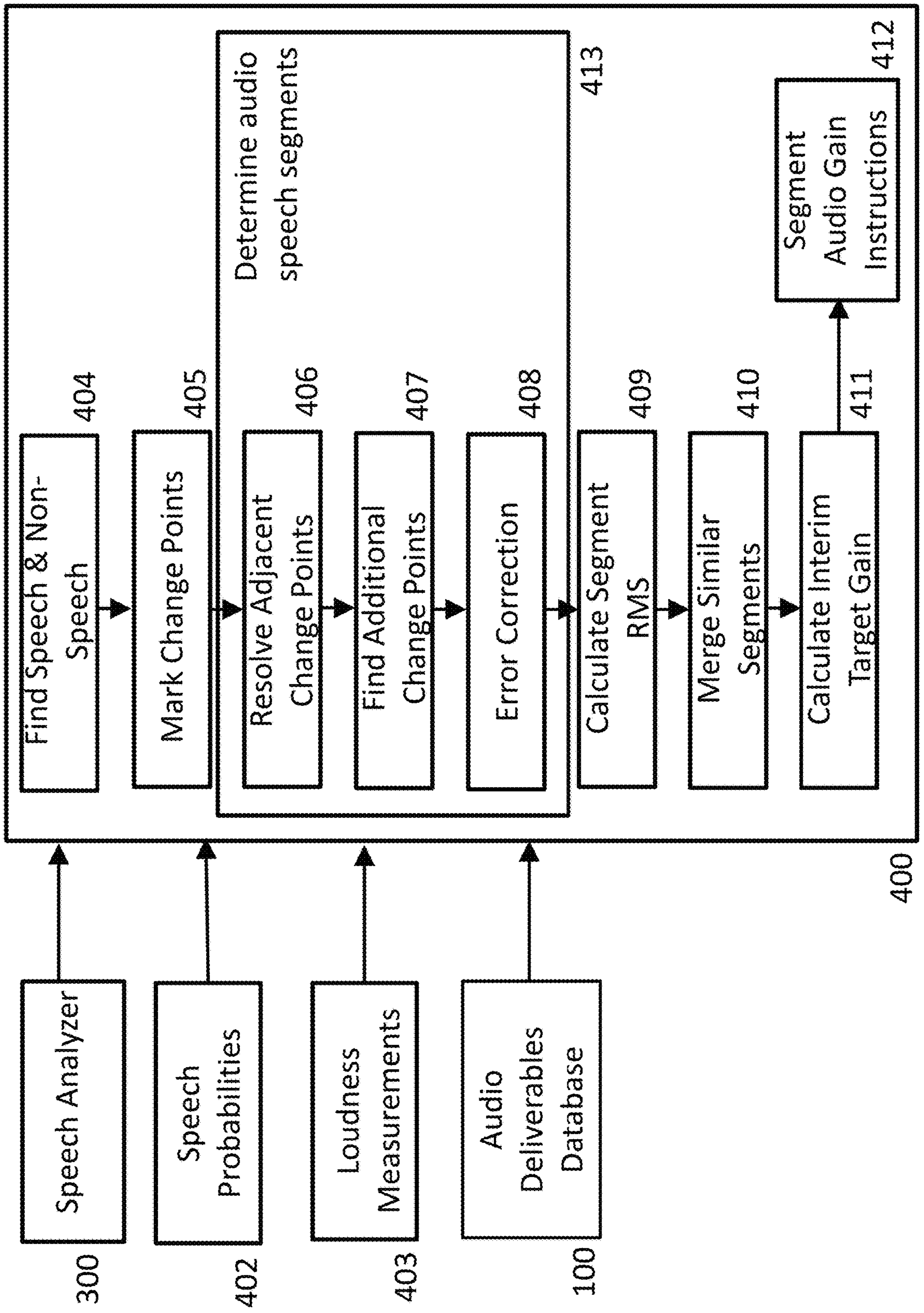
FIG. 5 illustrates an example audio speech decision engine architecture.

Referring to FIGS. 3, 5, a speech analyzer system 300 may be configured to measure loudness according to BS.1770 or EBU-R128, or otherwise. The loudness measurement may utilize short time loudness (sometimes referred to as short term loudness) and/or integrated loudness with an appropriate frame size (e.g., a frame size of 200 ms, although optionally other frame sizes may be used such as 20 ms, 100 ms, 1 second, 5 seconds and other time durations between).

The speech analyzer system 300 may utilize speech detection. The speech detection process may utilize a window size of 10 ms such that probabilities of speech (or other speech likelihood indicators) are determined for each frame and optionally other window sizes may be used such as 1 ms, 5 ms, 200 ms, 5 seconds and other values between.

The speech detection process may be configured for the time domain as input with other domains possible such as frequency domain. If the domain of the input is specified as time, the input signal may be windowed and then converted to the frequency domain according to the window and sidelobe attenuation specified. The speech detection process may utilize a HANN window although other windows may be used. The sidelobe attenuation may be 60 (dB) with other values possible such as 40 dB, 50 dB, 80 dB and other values between. The FFT (Fast Fourier Transform) length may be 480 with other lengths possible, such as 512, 1024, 2048, 4096, 8192, 48000 and other values between.

If the domain of the input is specified as frequency, the input is assumed to be a windowed Discrete Time Fourier Transform (DTFT) of an audio signal. The signal may be converted to the power domain. Noise variance is optionally estimated according to Martin, R. "Noise Power Spectral Density Estimation Based on Optimal Smoothing and Minimum Statistics." IEEE Transactions on Speech and Audio Processing. Vol. 9, No. 5, 2001, pp. 504-512, the content of which is incorporated herein by reference in its entirety.

The posterior and prior SNR are optionally estimated according to the Minimum Mean-Square Error (MMSE) formula described in Ephraim, Y., and D. Malah. "Speech Enhancement Using a Minimum Mean-Square Error Short-Time Spectral Amplitude Estimator." IEEE Transactions on Acoustics, Speech, and Signal Processing. Vol. 32, No. 6, 1984, pp. 1109-1121, the content of which is incorporated herein by reference in its entirety.

A log likelihood ratio test and Hidden Markov Model (HMM)-based hang-over scheme are optionally used to determine the probability that the current frame contains speech, according to Sohn, Jongseo., Nam Soo Kim, and Wonyong Sung. "A Statistical Model-Based Voice Activity Detection." Signal Processing Letters IEEE. Vol. 6, No. 1, 1999.

The speech detection process may optionally be implemented using an application or system that analyzes an audio file and returns probabilities of speech in a given frame or segment. The speech detection process may extract full-band and low-band frame energies, a set of line spectral frequencies, and the frame zero crossing rate, and based on the foregoing perform various initialization steps (e.g., an initialization of the long-term averages, setting of a voice activity decision, initialization for the characteristic energies of the background noise, etc.). Various difference parameters may then be calculated (e.g., a difference measure between current frame parameters and running averages of the background noise characteristics). For example, difference measures may be calculated for spectral distortion, energy, low-band energy, and zero-crossing. Using multi-boundary decision regions in the space of the foregoing difference measures, a voice activity decision may be made.

A speech decision engine may utilize a system to determine speech and non-speech using speech probabilities output. The system may utilize a speech segment rule, non-speech segment rule and pad time to accomplish this so that the segment includes a certain amount of non-speech audio to ensure that the beginning of the speech segment is included in the volume leveling process. The speech decision engine may further determine where initial non-speech starts and ends.

A speech decision engine 400 may utilize short term loudness measurements 303 to identify significant changes in volume amplitude. The system may optionally utilize non-speech timecodes to identify where to start the short-term loudness search. The search may calculate multiple (e.g., 2) different mean values, searching backward and forward in time, using a window (e.g., a 3 second window and optionally other windows sizes may be used such as 0.5 seconds, 2 seconds, 5 seconds or up to the duration of each segment). The system may optionally evaluate each non-speech segment location to determine if a change point is present. When complete, a collection of time codes and change point indicators may represent the initial start and end points of candidate speech segments to be leveled. A change point may be defined as a condition where the audio levels may change by at least a threshold amount, and a change point indicator may be associated with a given change point.

The speech decision engine 400 may optionally be configured to identify immutable change points using the resolve adjacent change points system 406. A change point may be classified as immutable, meaning once set the change point indicator is not to be removed. Immutable may be defined as when a non-speech duration exceeds a threshold period of time (e.g., 3 seconds and optionally other non-speech durations may be used such as 0.5 seconds, 1 second, 5 seconds and other up to the duration of the longest non-speech segment).

The speech decision engine 400 may optionally be configured to resolve adjacent short time loudness change points using the resolve adjacent change points system 406. Adjacent change points may be identified as those occurring within a specified minimum time distance of each other. For example, the duration between change points may be <=3 seconds, although optionally other durations may be used such as 0.5 seconds, 2 seconds, 10 seconds 60 seconds or other value between.

The speech decision engine 400 may be configured to merge, add, remove, and/or correct the end points of candidate audio speech segments to determine the final audio speech segments using the interim target audio level system 410 for leveling. For example, similar audio segments may be merged. For example, adjacent audio segments within 2.5 dB (or other specified threshold range) of each other may be merged, thereby reducing the number of audio segments.

The speech decision engine 400 may optionally determine an interim target audio level (ITAL) using the interim target audio level system 411, which may also be used to merge similar, adjacent audio segments. The ITAL may be dynamically updated based on the audio deliverables database output. The ITAL may optionally be utilized to provide audio gain instructions for the audio speech segment leveler. The ITAL may enable the dynamics audio processors threshold values to be in range more often than they would have otherwise.

Figure 6:
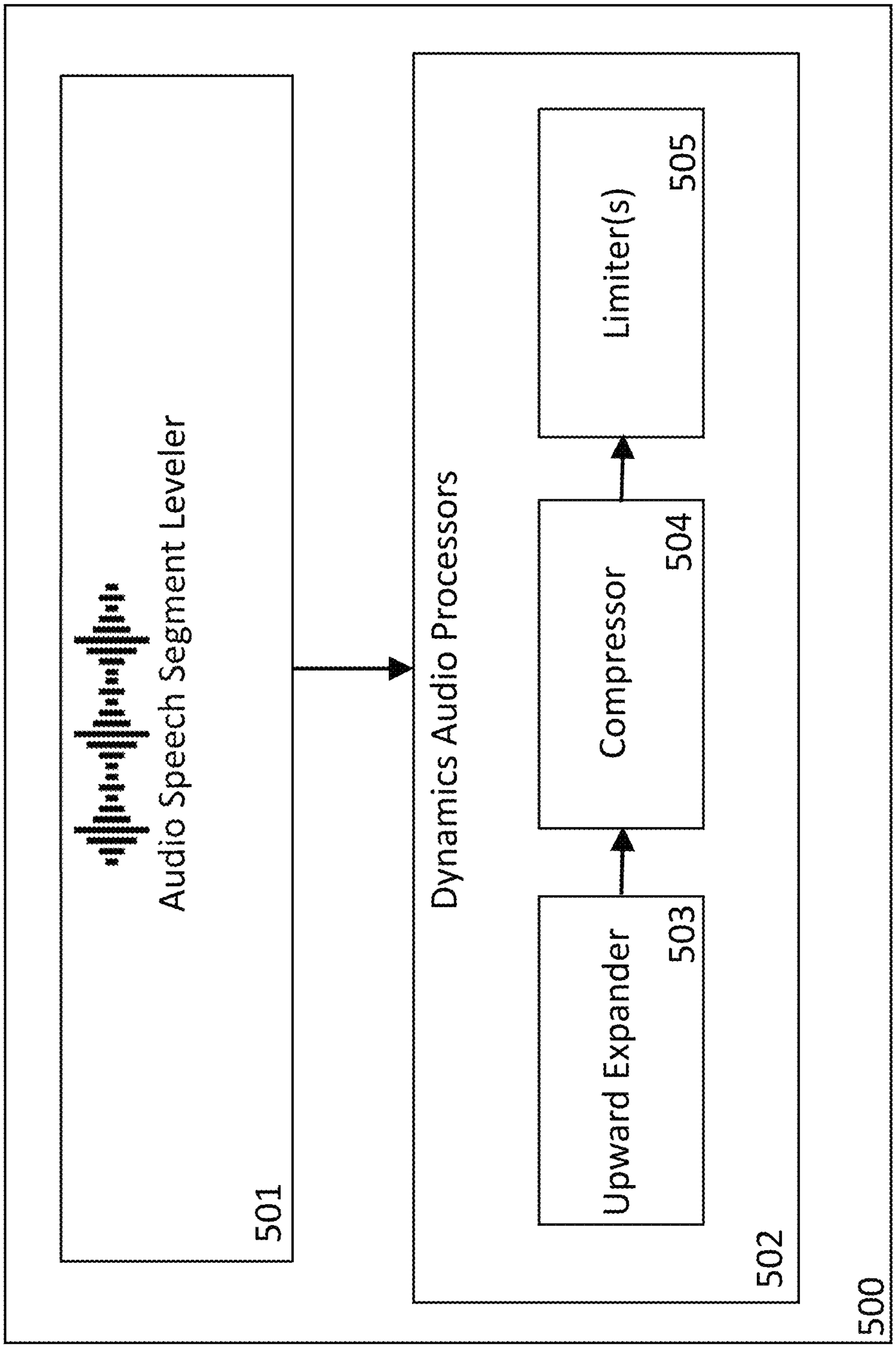
FIG. 6 illustrates an example audio volume leveling architecture.

Referring to FIG. 6, a volume leveler system 500. may utilize an audio speech segment leveler 501. The audio speech segment leveler 501 may apply segment audio gain instructions 412 (see, e.g., FIG. 5) as input. The audio segment gain instructions 412 may be used to uniformly increase or decrease the amplitude at specific time codes (see, e.g., FIG. 7, waveform 506) and may further be utilized to reach an interim target audio level (ITAL) for example −34 dB and optionally other values as calculated from data received from an audio deliverables database 100.

The volume leveler system 500 may utilize dynamics audio processors 502 to meet various international audio loudness requirements or specifications including target loudness, integrated loudness, short time loudness and/or max true peak. The dynamics audio processors 502 may process fames of audio continuously over time when a given condition is met, for example, when the amplitude exceeds or is less than a pre-determined value. The parameters may be pre-determined or the parameters may update dynamically, dependent on the output of the audio deliverables database FIG. 8.

The dynamics audio processors 502 may be optimized for upward expanding 503 (e.g., to increase the dynamic range of the audio signal). The upward expander floor value may utilize the previously calculated noise floor determined from the non-speech segments within a speech detection table. The amount of gain increase in the output of the upward expander may be dependent on the upward expander 503 threshold. The upward expander may optionally utilize the output of the audio deliverables database 100 to dynamically update the threshold where needed. The upward expander 503 may utilize a range parameter. The upward expander 503 range may be used to limit the max amount of gain that can be applied to the output.

Figure 9:
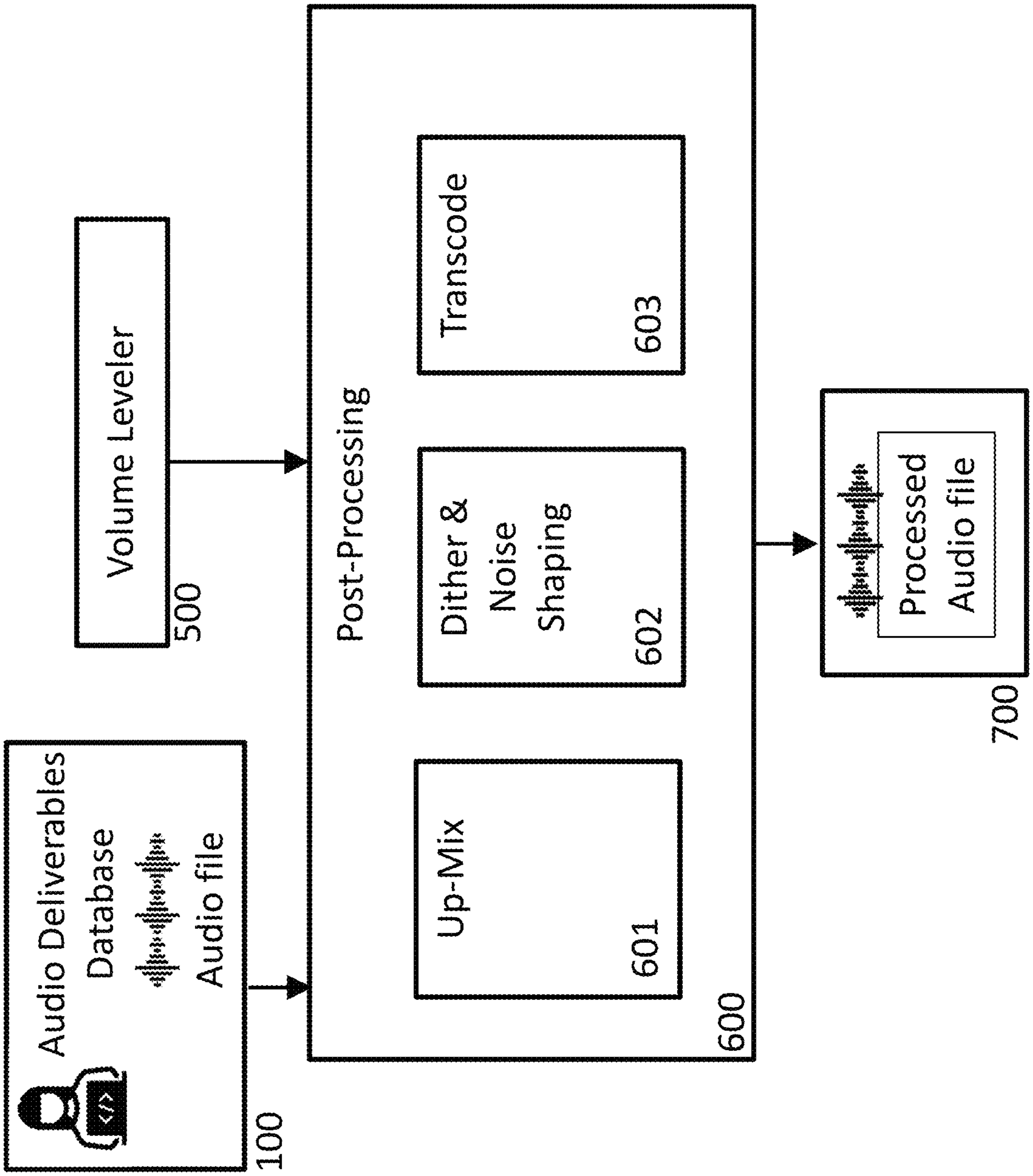
FIG. 9 illustrates an example audio post processing architecture.

A post processing system 600 may be configured to transcode audio files (see, e.g., FIG. 9). The transcode system may optionally be configured to receive the output of the audio deliverables database 100 to determine the transcode needed.

Figure 11:
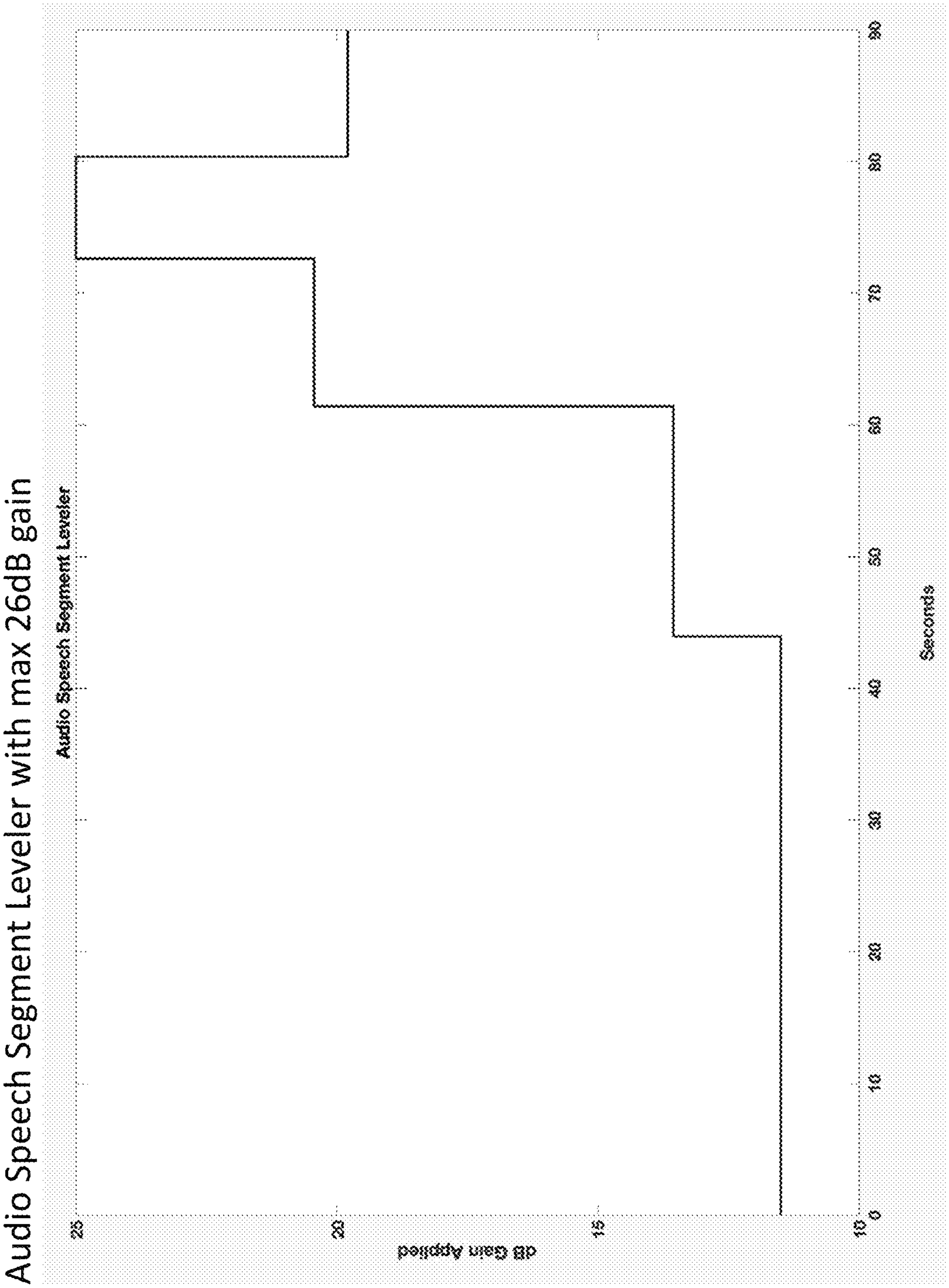
FIG. 11 illustrates an example gain staging waveform corresponding to distributed gain stages for audio speech segment leveler.
Figure 12:
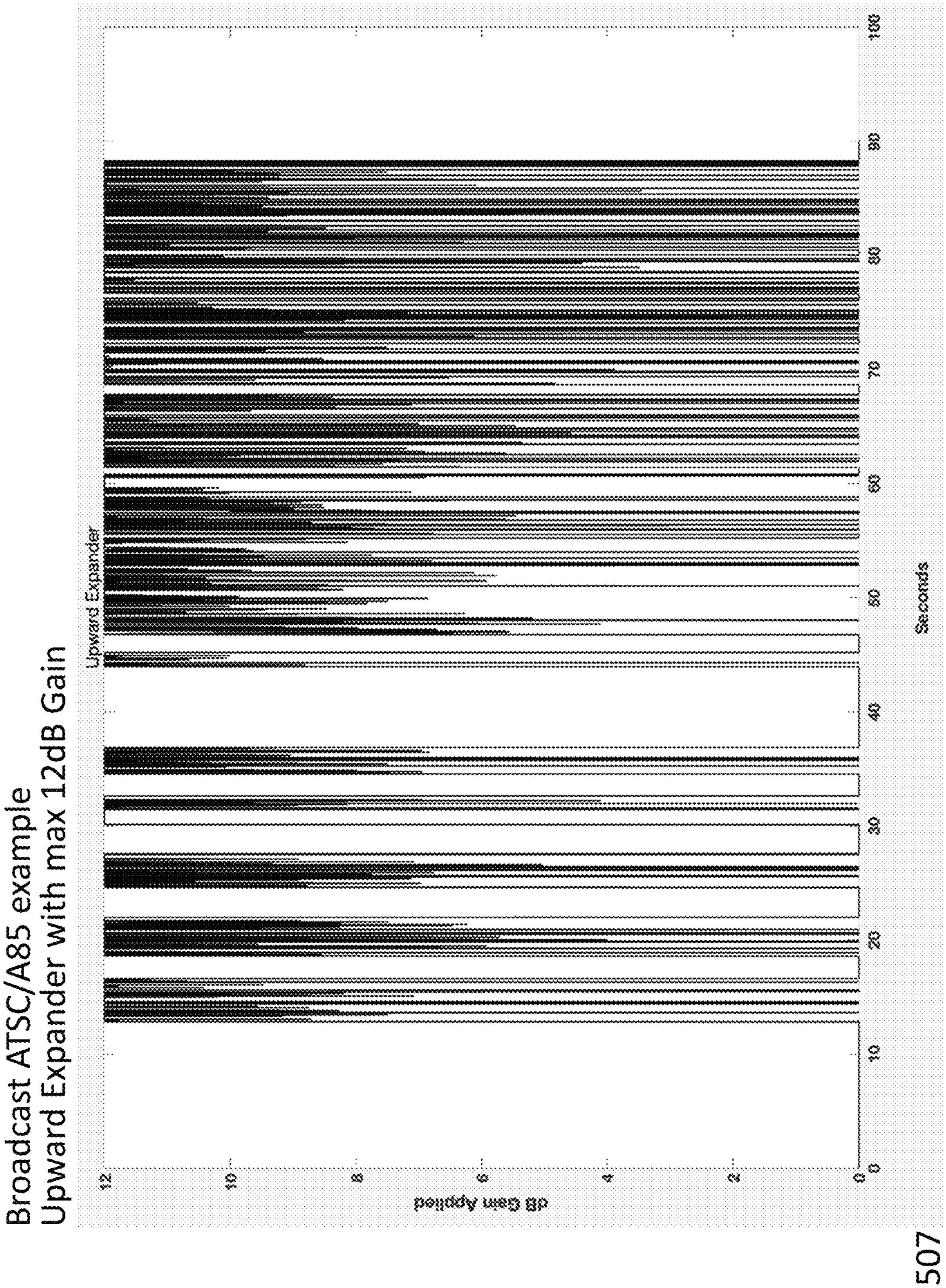
FIG. 12 illustrates an example distributed gain staging waveform corresponding to distributed gain stages for an upward expander.
Figure 13:
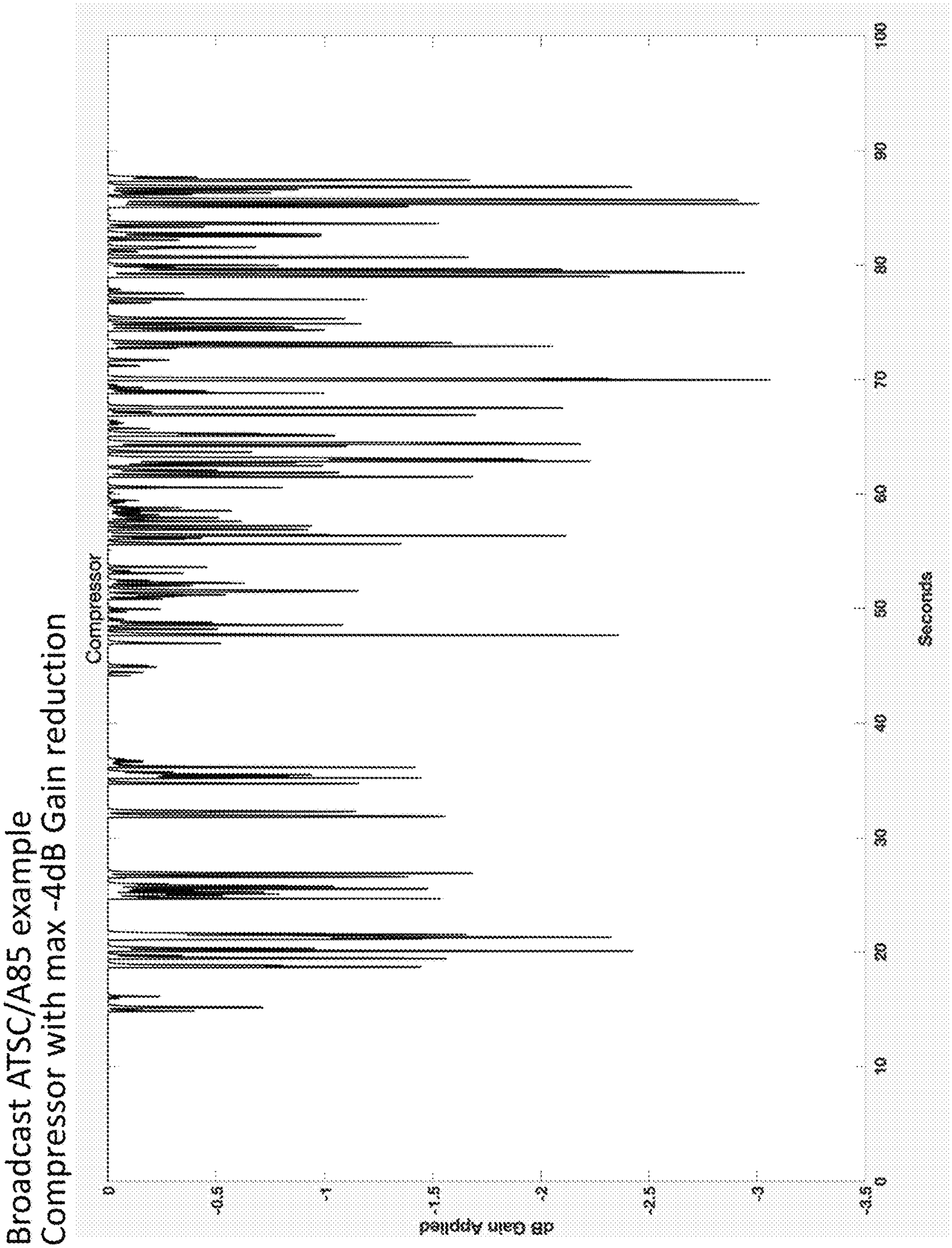
FIG. 13 illustrates an example waveform corresponding to distributed gain stages for a compressor.
Figure 14:
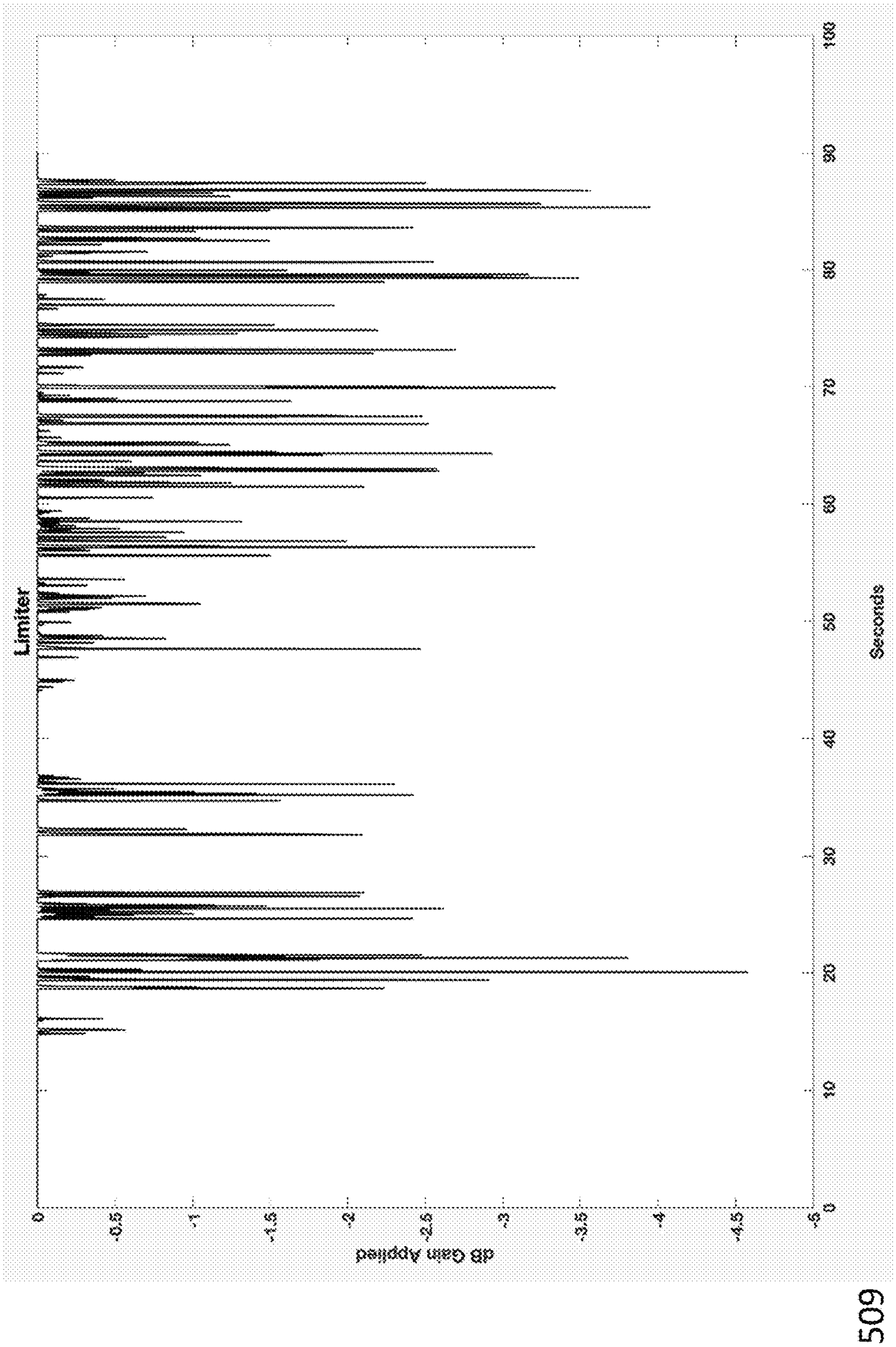
FIG. 14 illustrates an example waveform corresponding to distributed gain stages for a limiter.

The system may optionally be configured for distributed gain staging (see, e.g., the example waveform 506 illustrated in FIG. 11, the example waveform 507 illustrated in FIG. 12, the example waveform 508 illustrated in FIG. 13, the example waveform 509 illustrated in FIG. 14). such that no one processor is solely responsible for supplying all the needed gain. The distributed gain staging may optionally be utilized to improve the overall sound quality as well as help to eliminate audible volume pumping found in conventional volume leveling.

FIG. 1 illustrates an example system and processes for leveling speech in multimedia files. The system may utilize a preferred method of frame-base 200 or optionally sample-based processing or load the entire multimedia file into memory for processing. The frame sizes may vary depending on the process and may optionally include frame sizes such as 480, 1024, 2048, 4096, 9600, 48000 while many others may be used. Frame-based processing may process data one frame at a time. Each frame of data may contain sequential samples.

As noted above, the system and processes illustrated in FIG. 1 may be utilized for leveling speech in multimedia files. The example system and processes may overcome some or all the deficits of the conventional approaches. The multimedia file may be audio files, an audio stream, video files with embedded audio, or any other type of files containing audio. A user may upload audio files manually by way of a web-based application or other software. Optionally, files can be uploaded in a more automated fashion using a watch folder or application programming interface. The system may process files on-premise, in a data center or in the cloud, or otherwise. For example, the system can be accessed from a mobile device or the system may run in a mobile device enabling a more remote workflow.

Figure 2:
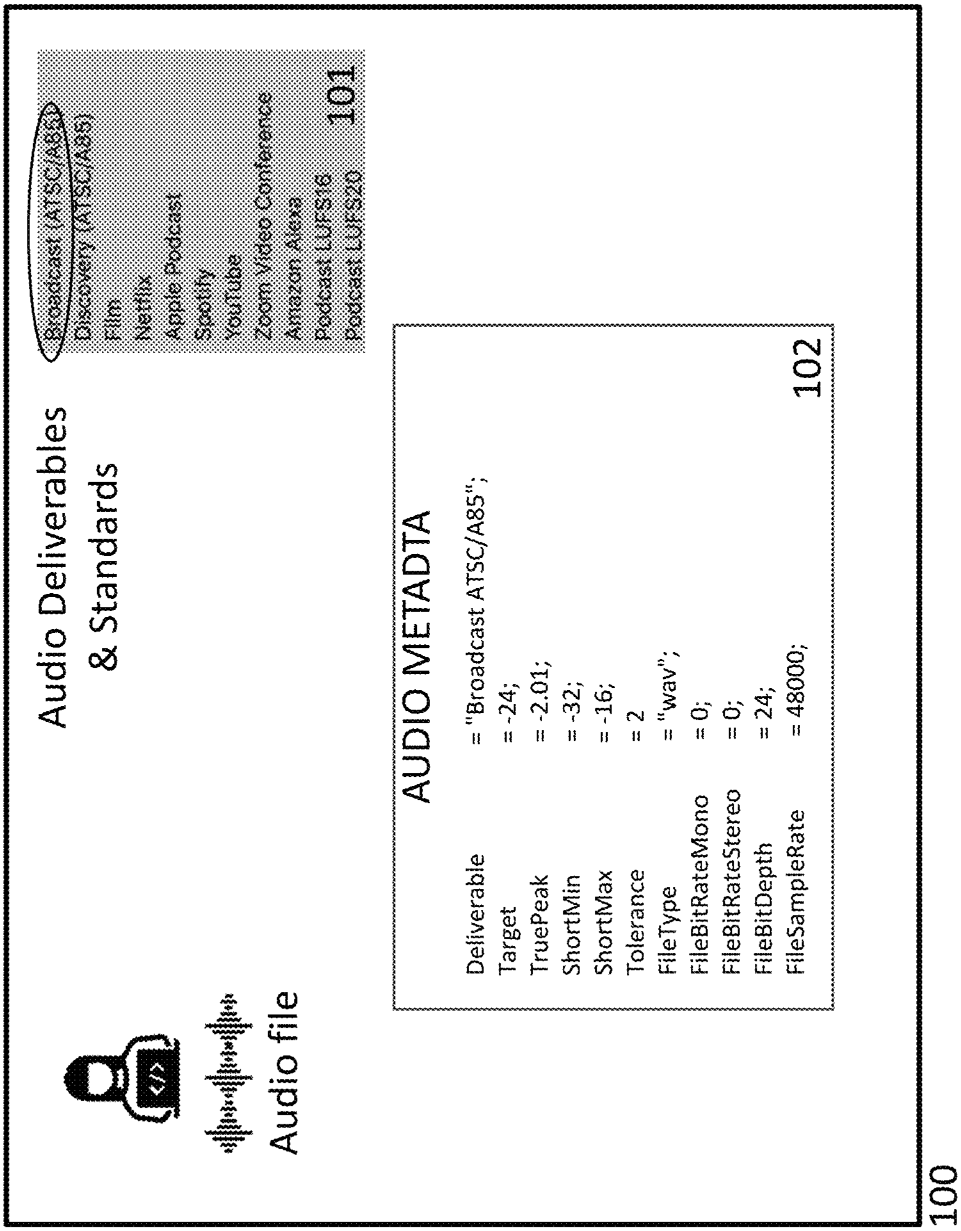
FIG. 2 illustrates example audio deliverables and standards.

FIG. 2 illustrates an example of audio deliverables and standards, including an audio deliverable database 101 with required/specified audio standards and deliverables that may be received by the system. Optionally, a menu user interface may be provided via which the user may select a deliverable (wherein the deliverable may be a distribution platform and/or a codec used by a distribution platform). The audio file and associated metadata may also be received by the system or may be automatically selected by the system based on the specified distribution platform/codec. For example, different metadata (e.g., different loudness specifications or other parameter specifications) may be associated with different deliverables. The metadata associated with the deliverables and standards 102 may include the specified deliverable standard (e.g., specified via the menu selection discussed above), integrated loudness, short time loudness, momentary loudness and true peak, audio file format information, audio codec, number of audio channels, bit depth, bit rate and sample rate. A user can optionally manually pick the deliverable/distribution platform from the database using a graphical user interface or the deliverable/distribution platform selection can be pre-determined for workflows that repeat using templates, profiles, or received via an application programming interfaces.

FIG. 3 illustrates an example system configured to perform pre-processing on audio files. The pre-processing system 200 may provide improved sound quality and overall system performance, including enhanced accuracy of a speech analyzer 300, reduced audible noise, reduced hiss, reduced hum and reduced frequency range differences for multi-microphone and multi-speaker recordings. The pre-processing system may determine to downmix and/or up sample 203 when the number of channels is greater than a specified threshold (>1) and/or the sample rate may be less than a specified threshold (e.g., <48 kHz). For example, if the file is stereo or contains 2 channels of audio, downmixing may be handled by summing both channels, what is commonly known as L+R (left+right). The various systems in FIG. 1 may perform faster, more accurately and generate better sounding audio signals when the initial files received are approximately the same average level. Therefore, a normalization function 201 may be utilized. The normalization may be pre-determined to be −50 dB RMS and sometimes referred to herein as the normalized target audio level or (NTAL.). Optionally other normalization values may be used such as −55 dB, −45 dB or other values. The pre-processing system 200 may calculate the RMS (root mean square) value, or the effective average level of the initial audio file to determine the gain needed to reach the NTAL. The following is an example of the calculation:

Where:

Frame=48e3 samples of audio

FA=RMS for each Frame in dB

F100=The last 100 ms of samples of each Frame.

A100=the RMS of F100 in dB.

AMP3=the RMS for 3 seconds of audio in dB

F3Sec=3 seconds of audio that begins after each FA.

PNV=the single RMS representation of all the Frame Amplitudes (FA) within the original multimedia file.

NTALGain=the gain needed to reach the NTAL.

FA=dB(RMS(ABS(Audio Frame)))

A100=dB(RMS(ABS(F100))

AMP3=dB(RMS(ABS(F3Sec)))

If A100<−70 dB (near silence) then check AMP3

If the AMP3 is <−70 dB then skip measuring the FA until the end of near silence.

Gather FA measurements generated for the file.

Calculate FA for duration of file:

PNV=RMS(ABS(FA's))

PPNTGain=ABS(PPNT)−abs(PNV)

Optionally, the calculation excludes near silence and silence from the measurement, which improves accuracy in regard to speech volume. Once the difference is determined, the pre-processing system 200 may effectively normalize any file it receives to the same average level. While the preferred method is to filter after normalizing, it may also be beneficial to normalize after filtering. For example, when the ratio of non-speech to speech is high and SNR may be poor, normalization may preform less than adequately. Therefore, in such a scenario, normalization may be performed after filtering.

The pre-processing system 200 may optionally filter audio according to human speech. The filters may be high-pass and/or low-pass. The low-pass filter slope may be calculated in decibels per octave and be set at 48, although optionally other values may be used such as 42, 44, 52, 58 and other values between. The low-pass filter cutoff frequency may be set to 12 kHz, although optionally other slopes and cutoffs may be utilized, such as 8 kHz, 14 kHz, 18 kHz, 20 kHz, or other values. For example, when noise hiss is at a lower frequency, the filter cutoff frequency may be set to a corresponding lower value to reduce the hiss.

The pre-processing system filters settings may be pre-determined or change dynamically with the preferred method being pre-determined. The high-pass filter slope may be calculated in decibels per octave and be set at 48. The high-pass filter cutoff frequency may be set to 80 Hz, although optionally other slopes and cutoffs may be utilized such as 40 Hz, 60 Hz, 200 Hz and other values between. For example, when recorded microphones vary greatly in bass response, the filter cutoff frequency may be set to a corresponding higher value to reduce the differences in the range of bass frequencies across the various speakers. Another benefit of the filters is added precision in the dynamics processors 502 with regards to threshold. For example, excessive amounts of low frequency noise outside the human speech range have been known to artificially raise the level of audio. This in turn effects the dynamics processors threshold value in a negative way, therefore eliminating noise outside the human voice range provides an added benefit in the volume leveler system 500.

FIG. 4 illustrates an example speech analyzer system that may utilize loudness measurement generated by the loudness measurements system 302, peak detection 306, and speech detection 308. The speech analyzer may utilize the output from the prepressing system 200.

The example loudness measurements system 302 may optionally utilize the BS.1770 standard, while other standards such as the EBU R 128 or other standards may be used. A frame, or window size of a certain number of samples (e.g., 9600 samples, although optionally other numbers of samples may be utilized, such as 1024, 2048, 4096, 14400, 48000, etc.). The loudness measurements may be placed in an array consisting of time code, momentary loudness, momentary maximum loudness, short time loudness, integrated loudness, loudness range, and loudness peak, and/or the like.

The system illustrated in FIG. 4 may be configured to perform peak detection 306 and speech detection 308. The peak detection 306 may utilize a sliding window method to determine the moving maximum. In this method, a window of specified length may be moved over each channel, sample by sample, and the object determines the maximum of the data in the window measured whereby a frame, or window size of 480 samples may be utilized. The window size of 480 samples may provide added precision. For example, some peaks such as inter-sample peaks may be difficult to locate with larger window sizes. Other frame/window sizes such as 256 samples, 512 samples, 2048, and up to the total samples, may be utilized with others possible. The peak may be defined as the largest value within a frame while other methods may be used such as the largest average within a sequence of steps with many others possible. Peak statistics 307 (comprising variable peak levels) may be placed in a table containing the time codes of each measurement and may include peak amplitude and peak dB value with others possible.

As discussed above, FIG. 4 illustrates a system for detecting speech, using speech detection 308, whereby a frame, or window size of 480 samples may be utilized and optionally other frame sizes such as 128 samples, 512 samples, 2048 samples with many others possible may be used. The speech detection probability is defined as the probability that speech exists within each frame. The probability values may range from 0 to 1 where 0 indicates 0 percent probability of speech and 1 indicates 100% probability of speech, with other representations possible. Speech Probabilities 310 may be placed in a Speech Detection array containing the time code of each measurement, Probability value and Noise estimate, and/or other data.

The speech analyzer illustrated in FIG. 4 may include a system for error correction of speech probabilities, within the Speech Detection array that may have been previously classified in error as speech. The error correction process 309 may invoke a Peak detection algorithm that utilizes variable Peak statistics 307 (which may comprise peak levels) based on the bits per sample for the file (which may be an audio file or a multimedia file including audio and video). One such definition may be to select the Non-Speech Peak value from the table below that matches the bits rate of the multimedia file where:

| Bits per sample | Non-Speech Peak |
|---|---|
| 32 | −144 |
| 24 | −144 |
| 16 | −90 |
| All others | −72.44 |

The error correction process may search for peak levels in the peak statistics 307 less than the Non-Speech Peak value, and when such peak levels are found, set the corresponding speech probability within the speech detection array to a probability of 0%, which may then indicate non-speech.

Referring to FIG. 4, error correction module 304 may evaluate the loudness measurements array 303 and correct the time code where the actual loudness measurements begin. This may account for timing offsets due to frame-based processing. One optional method starts at the beginning of the loudness measurements array and searches the short-term values for the first entry that exceeds the minimum allowed, such as −90 dB although optionally other values may be used such as −144 dB, −100 dB, −80 dB, −70 dB and others possible. If this condition is discovered, the prior array entry may be set to be the current entry value, while other entries and values may be used.

FIG. 5 illustrates an example speech decision engine 400 for identifying volume leveling problems in speech. The speech decision engine 400 may optionally be configured to correct the volume leveling problems. The speech decision engine 400 may be configured to retain the emotion and characteristics found in human speech. A preferred minimum duration for speech segments is 3 seconds and optionally other durations such as 1 second, 5 seconds, 10 seconds, or other durations up to the duration of the audio file may be used.

The example speech decision engine 400 illustrated in FIG. 5 may be configured to make an initial determination as to where non-speech starts and ends known as find speech & non-speech 404. The find speech & non-speech system may utilize the output of the speech probabilities module and process 402. The find speech & non-speech system may analyze the speech probabilities module 402 output to determine speech from non-speech. The system may utilize a speech segment rule to accomplish this. For example, when speech probability is >=75% and has a minimum duration of 200 ms and at least 1 entry where speech probability is 100%, the segment may be identified as speech. Optionally other values may be possible with the probability being as low as 25% or as high as 100% and the minimum duration as short as 1 ms and up to the file duration.

To identify non-speech the system may utilize the following example rule. For example, non-speech segments may be defined as when speech probability falls below 75% for a minimum duration of 100 ms. Optionally other probabilities may be used that are typically less than the speech probability but may also be greater. Other non-speech durations may be used as low as 1 ms or up to the file duration.

The example speech decision engine 400 may utilize a duration of time, known as pad time, to help ensure the detected time code is located within non-speech and not speech. For example, after all the speech and non-speech segments have been identified, pad time may be applied to each segment start and end time code. The pad time may be added to the start of each non-speech segment and subtracted from the end of each non-speech segment. The pad time may be defined as 100 ms and optionally other times as short as 1 ms or as long as the previously identified non-speech segment and any value between may be used.

FIG. 5 illustrates an extension to the system 404 which may identify the softest non-speech and softest speech for the entire file duration. As a first step all non-speech audio segments may be measured where:

SoftNonSpeech=dB(rms(non-speech segment))

The speech audio segments may be measured to find the softest speech by moving through each speech segment using a window and step where the window size may be 400 ms in duration and optionally other values as short as 10 ms and as long as the speech segment. The Step size may be 100 ms in duration and optionally other values as short as 1 ms and as long as the speech segment may be used. The following describes how each speech segment is searched for the softest window:

SpeechLevel=dB(rms(speech window segment))

For each measurement of SpeechLevel it may need to pass acceptance tests before being accepted. The acceptance tests may be defined where:

1. Speech Level>=−70 dB
2. Speech Level<Softest Speech

If the Speech Level passes the acceptance tests the Speech Level may be set as the new Softest Speech.

This process may continue evaluating the acceptance test for the all the speech segments and when complete, Softest Speech may contain the value and location of the softest speech.

FIG. 5 illustrates a system 403 that may utilize short time loudness to identify significant changes in amplitude. The system 403 may identify non speech locations. The system 403 may utilize the non-speech timecodes to identify where to start the short-term loudness search. The search may calculate two different mean values using a 3 second window and optionally the windows sizes may as short as 0.5 seconds and as long as speech segment with any value between. The first mean value may be calculated using the previous windows short time loudness values and the second mean value may be calculated using the next windows short-term values. After both mean values are calculated the system may derive a number of difference calculations at each non-speech location, each representing a unique condition. One possible method is to calculate three separate differences where:

CNSL=Current Non-Speech time code
NNSL=Next Non-Speech time code
NM=Next mean of Short-Term time code
PM=Previous mean of Short-Term time code
Diff1=NM at CNSL−PM at CNSL
Diff2=PM at NNSL−PM at CNSL
Diff3=NM at NNSL−PM at CNSL FIG. 5 illustrates a mark change point system 405 that may evaluate the audio loudness at each non-speech segment location to determine if a change point may be present. A change point may be defined as a condition where the audio levels may change by at least predetermined amount, such as 3 dB, optionally other values such as 1 dB, 4 dB, 6 dB and ranging from 0.1 dB up to 40 dB may be used. At each non-speech location if Diff1>3 dB the system may mark the non-speech time code as a change point. When complete, a collection of time codes and change points may represent the initial start and end points of candidate speech segments to be leveled. In another aspect the system may calculate the mean of the integrated measurements for the candidate speech segments and optionally the short-term loudness or the momentary loudness values may be used.

The mark change point system 405 of the speech decision engine 400 may identify immutable change points. A change point may be classified as immutable indicating the change point may never be removed. Immutable may be defined as when a non-speech duration exceeds 3 seconds with other durations possible such as 1 second, 5 seconds or any value between 0.5 seconds and up to the duration of the longest non-speech segment. Some or all of the change points may be evaluated and if a non-speech duration meets the definition of immutable the change point may be marked as immutable.

A further refinement of the identification of speech and non-speech content may be performed using the processing at blocks 406, 407, 408. FIG. 5 Illustrates a resolve adjacent change points system 406 configured to execute a process to resolve adjacent change points. Adjacent change points may cause the audio speech segment leveler 501 to perform poorly, such that words and short phrases may be raised or lowered at incorrect times. Adjacent change points may be identified as change points occurring too close to each other in time. For example, when the duration between change points is <=3 seconds, and optionally other durations may be possible, such as 1 second, 5 seconds or other values between 1 second and 60 seconds.

The resolve adjacent change points system 406 may check to determine if any of the pairs of change points are marked as immutable. If both change points are marked immutable the change points may be skipped. If one of the change points is immutable the change point that is not marked immutable may be removed. If none of the change points are marked immutable then a further check may be performed.

For example, if one, or both of the change points have a Diff1 value>=10 dB then the change point with the smallest Diff1value may be removed. This further check may also improve the sound such that when the speech suddenly rises or falls by an extreme amount over a short time period the volume fluctuation may be reduced. If, however, both change points have a Diff1<10 dB the system may remove the 2nd change point. When the resolve adjacent change points system 406 has completed its resolving process, the change points remaining may be another step closer to the final list.

Speech levels may at times change slower than normal and not identified, therefore the system may provide a method for identifying these slow-moving changes.

FIG. 5 illustrates a system 407 configured to find additional change points. The system 407 may improve the ability to accurately identify missed change points previously not detected. For example, speech levels may at times change slower than normal and thus not identified, therefore the system 407 may provide a method for identifying these slow-moving changes. The system 407 may utilize the following example method to detect when audio segment levels may be slowly changing, such that it needs more than a single audio segment to achieve the desired change amount. The system 407 may evaluate the non-speech locations that are not identified as change points and apply a series of tests which are described herein. A first test may check for a plurality of conditions, optionally all of which must be true for the first test to pass:

1. the current non-speech segment is not a change point
2. the previous non-speech segment is a change point.
3. the time duration between both change points is greater than a first threshold (e.g., 3 seconds, and optionally other time durations such as short as 0.5 seconds and up to 60 seconds).

A second test may check for when both the current and previous non-speech segments are not change points. If either the first test or the second test passes, then a third test may be evaluated. The third test may check for certain conditions (e.g., 2 conditions), any of which must be true to pass:

1. if Diff2>4 dB
2. if Diff3>3 dB

Optionally Diff2 may be compared to other values such as 1 dB, 3 dB, 6 dB up to 24 dB with values between. Optionally Diff3 may be compared to other values such as 1 dB, 3 dB, 6 dB up to 24 dB with values between. If the third test passes it may be determined the audio has changed by a sufficient amount to justify adding a new change point for the current non-speech segment.

FIG. 5. Illustrates an error correction system 408 that may evaluate change points, non-speech segments, and speech segments to correct any errors that may have been introduced by the systems 404, 405, 406, 407 which may correct the errors by merging segments. A series of validation steps may be performed where:

CurrSeg=Speech segment between current change point and next change point

PrevSeg=Speech segment between current change point and previous change point

A significant point is that removing a change point may merge two segments into one new longer segment.

For each change point the following validation steps may be processed in the order indicated where:

The validation process may include the following acts:

1. If both the current change point and the previous change point are marked as immutable the validation may skip to step 8.
2. If the time duration of CurrSeg<3 seconds, then evaluate steps 3 and 4, otherwise validation may skip to step 5. Optionally the CurrSeg time durations may be as short as 0.5 seconds and up to 60 seconds with any value between.

If this condition is not checked, short speech segments<=3 seconds may rise or fall in volume at erratic times and by drastic amounts.

3. If the current change point is marked as immutable, then the previous change point may be removed, and validation may skip to step 8.
4. If the previous change point is marked as immutable, then the current change point may be removed, and validation can skip to step to 8.
5. If CurrSeg<3 seconds and the previous change point is immutable remove current change point, otherwise remove the previous change point and validation can skip to step to 8.
6. If the current non-speech segment duration>3 seconds and the PrevSeg>30 seconds, then remove the previous change point. Optionally the PrevSeg time durations may be as short as 0.5 seconds and as long as 180 seconds with any value between.
7. If the current non-speech segment duration>3 seconds and the CurrSeg duration>30 seconds, then remove the current change point. Optionally the non-speech duration may be as short as 0.5 seconds and as long as 60 seconds with any value between. Optionally the CurrSeg duration may be as short as 0.5 seconds and as long as 180 seconds with any value between.

8. Remove all change points that occur within 8 seconds of the end of the file, Optionally, other time durations may be specified, such as 1 seconds, 10 seconds, 15 seconds and others possible. The effect of removing a change point is the current segment will be merged into the next segment.
9. Remove change points where the non-speech duration may be less than 0.11 seconds, optionally, other durations may be specified ranging from 0.01 seconds up to 3 seconds with any value between. Removing a change point is that the current segment will be merged into the next segment.

FIG. 5 illustrates a system 409 that may calculate an integrated loudness (e.g., RMS loudness) for each speech segment introduced within systems 404, 405, 406, 407. For example, the system 409 may calculate the integrated loudness such that for each speech segment read the audio file using a 1 second window and store 1 second of audio samples in an audio buffer. Optionally, window sizes may be 32 ms, 500 ms, 5 seconds with other times as long as the file.

The system 409 may optionally measure the integrated loudness for each audio buffer. The system 409 may utilize the final occurrence of the integrated loudness measurements for each speech segment for determining the speech segment integrated loudness.

FIG. 5 illustrates a system 410 to merge similar segments. Merging may occur under one or more conditions. A first condition may be defined as when the difference in integrated loudness values for two adjacent segments may be within a tolerance value, such as 2.5 dB, optionally other tolerance values between 0.1 and 30 dB may be utilized and calculated as:

Tolerance=Allowed segment difference, expressed in dB as 2.5 dB

CurrSegInt=Integrated loudness of the current speech segment.

NextSegInt=Integrated loudness of the next speech segment.

CCP=The change point between the current segment and the next segment (current change point)

SegDiff=ABS(CurrSegInt−NextSegInt)

If the SegDiff<=Tolerance then remove the CCP, thereby merging the current segment and the next segment.

The system 410 may define a second condition as when the duration of a current speech segment may be less than a predefined minimum duration, such as 3 seconds. Optionally other minimum durations may be used such as 0.5 seconds, 5 seconds, and others up to 60 seconds with any value between. If the minimum speech duration is detected for a speech segment, then the speech segment may be merged into the next speech segment.

FIG. 5 illustrates a system 411 configured to determine the gain needed to reach the interim target audio level of each speech segment. The system 411 may determine a new integrated loudness measurement for each speech segment which may be necessary since previously segment merges may have occurred. In a first aspect, the system 411 may determine the gain for the interim target audio level. For example, the system 411 may calculate an integrated loudness such that for each speech segment read the audio file using a 1 second window and to store the 1 second of audio samples in an audio buffer. Optionally a window size may be 32 ms, 500 ms, 5 seconds and other times as long as the file.

In a second aspect, the system 411 may measure the integrated loudness for each audio buffer. In a third aspect, the system 411 may utilize the final occurrence of the integrated loudness measurements for each speech segment for determining the speech segment integrated loudness.

In a second step, the gain, when applied, may raise or lower the speech segment audio level to reach the interim target audio level as determined by the output from the audio deliverables database 100. The interim target gain may be calculated by the system 411 where:

Interim Target=Audio deliverables ShortMin−2 dB where other values such as 0 dB up to 34 dB may be valid.

SSIL=Speech segment integrated loudness.

Interim Target Gain=ABS(Interim Target−SSIL)

FIG. 5 illustrates a system 412 configured to transfer the segment audio gain instructions to the volume leveler system 500 system, specifically the audio speech segment leveler system 501. This may be accomplished by gathering the needed metadata where:

BegTC's=the beginning time codes for each Speech Segment

EndTC's=the ending time codes for each Speech Segment

Interim Target Gain=the calculated gain to be applied to each audio Speech segment to reach the Interim target as defined in system 411.

The audio gain instructions may be stored in a storage location whereby the speech segment leveler system 501 may access the audio gain instructions.

FIG. 6 illustrates an example system and processes 500 for volume leveling. The volume leveling system 500 may include: an audio speech segment leveler 501 and various dynamics audio processors including upward expander 503, compressor 504, and limiter(s) 505. The system 500 may provide leveling via audio speech segment leveler 501 for one or more segments of audio. The system 500 may be configured to process the audio such as to meet audio loudness specifications.

Figure 7:
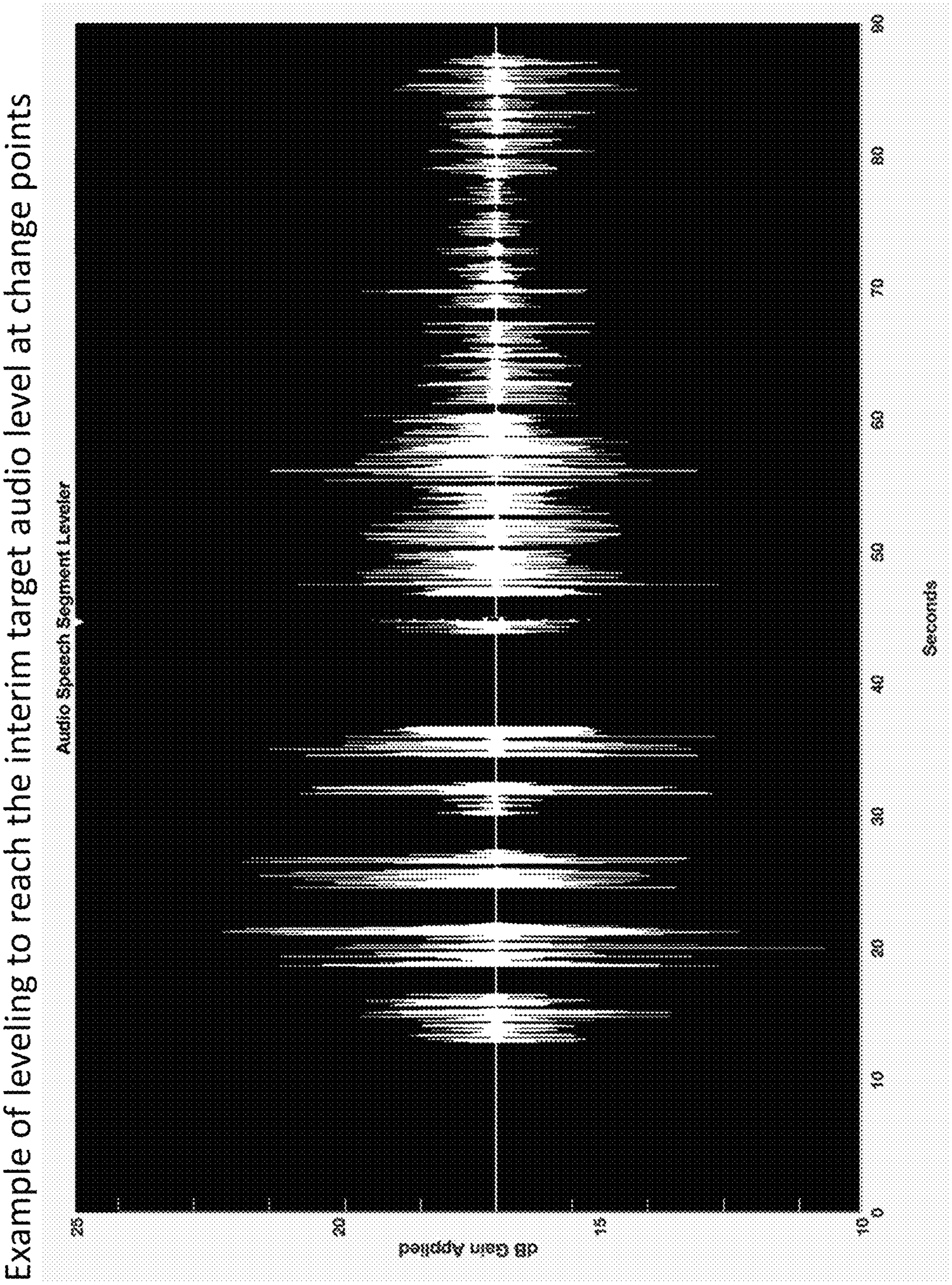
FIG. 7 illustrates an example leveling an audio speech segment.

The volume leveler system 500 may utilize distributed gain staging. FIG. 7 illustrates an example waveform corresponding to distributed gain staging, including an example of leveling to reach an interim target audio level at change points. For example, if Broadcast ATSC/A85 is output from the audio deliverables database 100 then the audio speech segment leveler may provide up to 26 dB of gain 506 and optionally gain may be as low as −50 dB and up to 50 dB with actual values derived within the audio deliverables database. The dynamic audio processor upward expander 503 may provide up to 12 dB of additional gain and optionally gain may be 0 dB and up to 50 dB with actual values derived within the audio deliverables database and further calculations. The audio speech segment leveler may utilize segment audio gain instructions 412 as input. The audio segment gain instructions may be used to uniformly increase or decrease the amplitude at specific time codes 506 and may further be utilized to reach an interim target audio level (ITAL) for example −34 dB with other interim target levels possible.

The audio speech segment leveler may be configured so that the signal envelope and dynamics remain unaltered for each audio segment.

By way of example the audio speech segment leveler may utilize a max gain limit function. The max gain limit may change dynamically based on the output of the audio deliverables database 100. The max gain limit may be calculated as:

max gain limit=ABS(NTAL−ITAL)+10 dB

Additionally, the following rules may be applied to the max gain limit function. If audio segment gain instructions>max gain limit, then apply the max gain limit otherwise apply the segment gain instructions.

Figure 8:
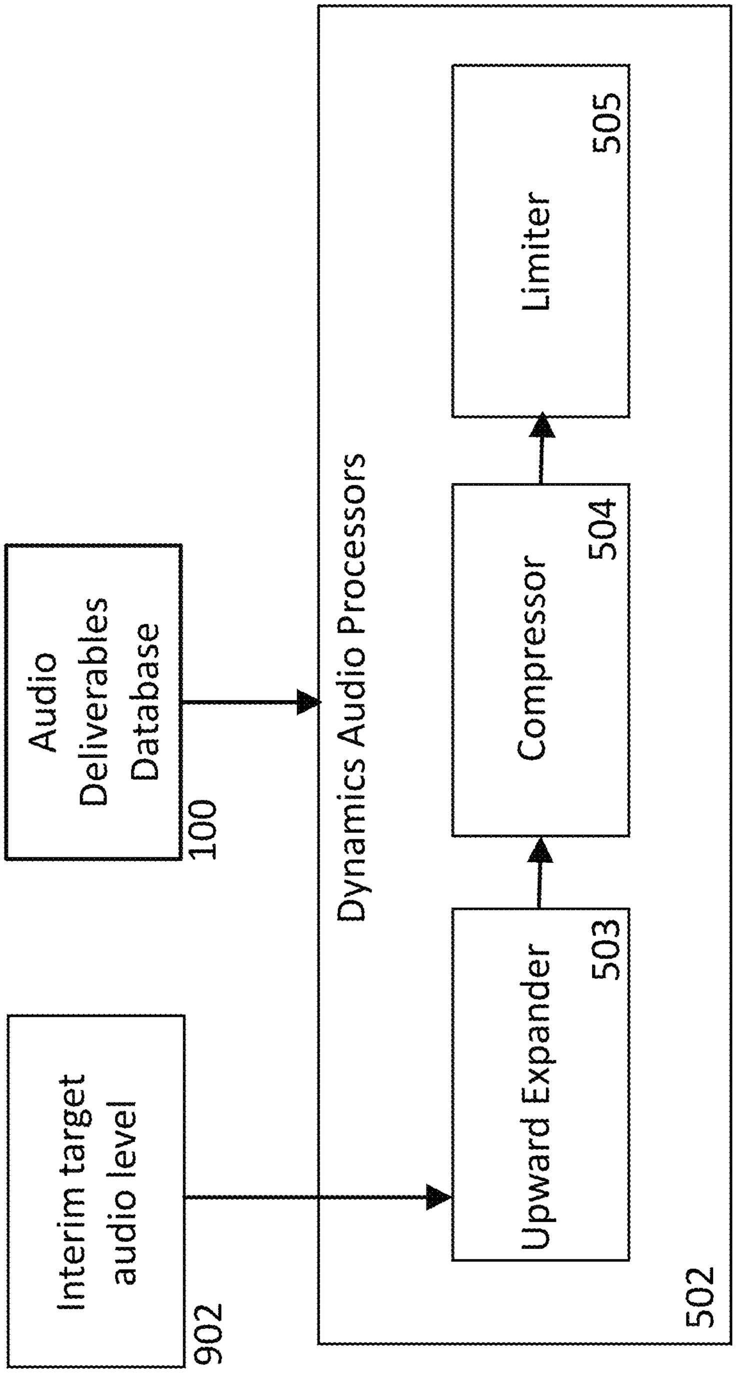
FIG. 8 illustrates example dynamics audio processors and audio parameters therefor.

Referring again to FIG. 6, the dynamics audio processors 502 may be used in part to meet various audio loudness specifications including target loudness, integrated loudness, short time loudness and max true peak. The dynamics audio processors 502 may process fames of audio continuously over time when a given condition is met, for example, when the amplitude exceeds or is less than a pre-determined value. FIG. 8 illustrates an example method for determining one or more parameters in the dynamics audio processors 502. The parameters may enable the dynamics audio processors threshold values to be in range more often than they would have otherwise.

The parameters may be pre-determined or may update dynamically, dependent on the output of the audio deliverables database 100. If the parameters are not pre-determined they may be calculated or matched to an audio loudness requirement or specification. For example, if the audio deliverables database output is Broadcast ATSC/85, the threshold value for the upward expander may be calculated as:

threshold=deliverable target audio level*0.5

By way of example the above may translate to:

threshold (−12 dB)=deliverable target audio level (−24)*0.5

In another example, the audio deliverables database output is LUFS20 (Loudness Unit Full Scale 20) in accordance with the EBU R128 standard, the threshold value for the upward expander may be calculated by way of example:

threshold (−10 dB)=deliverable target audio level (−20)*0.5

Furthermore, if the audio deliverables database output is LUFS20, the threshold for the hard limiter may utilize the max true peak specification from the LUFS20 loudness standard.

threshold (−1 dB)=LUFS20 true peak (−1 db)

By way of further example, if the audio deliverables database output is Broadcast ATSC/A85, the threshold for the limiter may utilize the max true peak specification from the Broadcast ATSC/A85 loudness standard.

threshold (−2 dB)=ATSC/A85 true peak (−2 dB)

The dynamics audio processor 502, may be optimized for upward expanding using the upward expander 503. The upward expander 503 attack and release functions may be optimized for speech. The upward expander attack may control how long it takes for the gain to be increased once the signal is below the threshold. The upward expander release may be used to control how long the gain takes to return to 0 dB of gain when the signal is above the threshold, with other methods possible. The upward expander release time value may be 0.0519 seconds and the attack time value may be 0.0052 seconds with other attack and release time values possible.

The upward expander 503 may be optimized for reducing noise by increasing the output gain of the signal only when the input signal is less than the threshold and greater than the floor value. The floor in the upward expander 503 may therefore provide an added benefit of enabling background noise to be reduced or remain at the same level relative to the signal regardless of how many dB the upward expander output gain may increase. The upward expander floor value may utilize the previously calculated noise floor determined from the non-speech segments within the speech detection table with other values or methods possible. The upward expander ratio value may be pre-determined as 0.5 with many other ratio values possible. The amount of gain increase in the output may be dependent on the upward expander ratio value. The upward expander threshold may be calculated as:

(deliverable target audio level*upward expander ratio)

The upward expander gain may be calculated as:

(upward expander threshold+(signal dB−upward expander threshold)*upward expander ratio)−signal dB The upward expander 503 may utilize a range parameter. The upward expander range may be used to limit the max amount of gain that can be applied to the output.

The upward expander range may be calculated as:

(interim target audio level−deliverable target audio level)+deliverable tolerance The range calculation may not always be precise enough to meet the number of different deliverable audio target levels FIG. 10 within the audio deliverable database 101. For example, the range calculation may be slightly low to moderately low. The upward expander 503 may compensate for this range calculation deficiency by utilizing a deliverable tolerance parameter. The deliverable tolerance parameter may be utilized to supply the necessary additional gain to meet the deliverable audio target level where the tolerance parameter may be negative or positive in value. The output from the audio deliverables database may be utilized to dynamically update the deliverable tolerance where needed. For example, if the output from the audio deliverable database 101 is Spotify, the tolerance may be set to 4 dB or if the output was Discovery ATSC/A85 the tolerance may be set to 1.5 dB.

By way of example, the dynamics audio processors 502 may utilize a compressor 504. The compressor 504 may reduce the output gain when the signal is above a threshold. The compressor threshold may be calculated as:

threshold=deliverable target audio level/2

This calculation may allow the threshold in the compressor 504 to be automatically updated to support different outputs from the audio deliverables database 100. Optionally, the compressor threshold may be set to the equivalent “short max loudness” metadata found in a given loudness specification 102, such as that illustrated in FIG. 2. The remaining values and time parameters in the compressor may be pre-determined as the following: compressor ratio value may be 2, compressor knee width may be 3 dB, compressor release time may be 0.1 seconds and compressor attack time may be 0.002 seconds with other values and times possible.

By way of example, the dynamics audio processors 502 may utilize a limiter 505 which may include one more limiters, such as a hard limiter and/or a peak limiter. The hard limiter may be configured such that no signal will ever be louder than the threshold. The hard limiter threshold may be set to the equivalent “true peak” audio loudness metadata output from the audio deliverables and standards database 102. This calculation may allow the hard limiter threshold to be automatically updated to support various loudness audio standards depending on the output from the audio deliverables database 100. The remaining values and time parameters in the hard limiter may be pre-determined as the following: The hard limiter knee width may be 0 dB, the hard limiter release time may be 0.00519 seconds, The hard limiter attack time may be 0.000 seconds and optionally the release and attack times may contain other time based values between 0 and 10 seconds.

By way of example, the dynamics audio processors 502 may optionally utilize a peak limiter which may process the audio signal prior to the hard limiter. The peak limiter may be configured such that some signals may still pass the threshold. The peak limiter may be utilized to improve the performance of the hard limiter. For example, the peak limiter threshold value may be calculated as such to reduce the number of peaks the hard limiter must process. The peak limiter threshold value may change depending on the true peak audio loudness specification such as set forth in the audio deliverables and standards 102. Further, the peak limiter threshold may be automatically updated to support various loudness audio standards depending on the output form the audio deliverables database 100. The remaining values and time parameters in the peak limiter may be pre-determined as the following: the peak limiter knee width may be 5 dB, the peak limiter release time may be 0.05519 seconds, the peak limiter attack time may be 0.000361 seconds with other values and times possible.

FIG. 9 illustrates an example system 600 for post-processing of an audio signal which may take place after some or all of the audio processing discussed above. The post processing system 600 may provide up-mixing 601, dither and noise shaping 602, and transcoding 603. The post-processing functions may be utilized to render processed audio file(s) 700 (including the processed audio digital data) according to the output of the audio deliverables database 100 including audio codec, audio channel number, bit depth, bit rate, sample rate, maximum file size with other formats possible. The input to the post-processing system 600 may utilize the volume leveler output 500 and the output of the audio deliverables database 100. The processed audio file(s) 700 may be transmitted to one or more destinations (e.g., broadcaster and/or streaming systems) for distribution and reproduction to one or more clients (e.g., user computing devices, such as streaming devices, laptops, tablets, desktop computers, mobile phones, televisions, game consoles, smart wearables, etc.).

The post processing dither and noise shaping functions may utilize the following methods, although other methods may be used. For example, if the audio deliverables database output file format is 24 bit, the post processing system dither and noise shaping 602 may utilize triangular_hp (triangular dither with high pass) and if the audio deliverables database output file format is 16 bit, the post processing system dither and noise shaping method may utilize low shibata. The post processing system may utilize other dither and noise shaping methods including rectangular, triangular, lipshitz, shibata, high shibata, f weighted, modified e weighted, and improved e weighted.

Additionally, the system illustrated in FIG. 1 may provide multiple different types of audio output types (e.g., final master, edit master, and/or format only). Final master may be utilized to output a file that meets content providers and/or distributors specifications. Edit master may be utilized to output a file that may be used for further audio editing. Format only may be utilized when leveling is not desired, but only transcoding, dithering and noise shaping is required.

Other Embodiments

Other implementations of content classification may be used in the description herein; various functionalities may be described and depicted in terms of components or modules. Furthermore it may be appreciated that certain embodiments may be configured to improve encoding/decoding of audio signals such as AAC, MPEG-2, and MPEG-4.

Optionally, certain embodiments may be used for identifying content broadcast on FM/AM digital radio bit streams.

Certain embodiments may enhance the measurement of audience viewing analytics by logging content classifications, which may be transmitted (in real-time or non-real-time) for further analysis and may derive viewing habits, trends, etc. for an individual or group of consumers.

Optionally, specific content identification information may be embedded within the audio signal(s) for the purpose of accurately determining information such as content title, start date/time, duration, channel and content classifications.

Optionally, channel and/or content may be excluded from processing from automation actions or other options. The exclusion options may be activated through the use of information within a Bitstream Control Database or from downloaded information.

Certain embodiments may also be used to enhance intelligence gathering or the interception of signals between people ("communications intelligence"—COMINT), whether involving electronic signals not directly used in communication ("electronic intelligence"—ELINT), or combinations of the two.

methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:

at least one processing device operable to:

receive audio data;

receive an identification of specified deliverables;

access metadata corresponding to the specified deliverables, the metadata specifying target parameters including at least specified target loudness parameters for the specified deliverables;

normalize an audio level of the audio data to a first specified target level using a corresponding gain to provide normalized audio data;

perform loudness measurements on the normalized audio data;

obtain a probability that speech audio is present in a given portion of the normalized audio data and identify a corresponding time duration;

determine if the probability of speech being present within the given portion of the normalized audio data satisfies a first threshold;

at least partly in response to determining that the probability of speech being present within the given portion of the normalized audio data satisfies the first threshold and that the corresponding time duration satisfies a second threshold, associating a speech indicator with the given portion of the normalized audio data;

identify and resolve non-immutable change point indicators that are within a threshold period of time of each other, wherein resolving non-immutable change point indicators comprises a change point modification, wherein if a given pair of change point indicators are marked as immutable, indicating that a duration of non-speech between the pair of change point indicators is greater than a specified threshold, the change point modification is inhibited with respect to the given pair of change point indicators marked as immutable;

based at least in part on the loudness measurements, associate a given portion of the normalized audio data with a pair of change point indicators that indicate a short term change in loudness that satisfies a third threshold, the pair of change point indicators defining an audio segment;

determine a gain needed to reach an interim target audio level for the given audio segment associated with the speech indicator;

use the determined gain needed to reach the interim target audio level to perform volume leveling on the given audio segment to thereby provide a volume-leveled given audio segment;

use one or more dynamics audio processors to process the volume-leveled given audio segment to satisfy one or more of the target parameters, including at least a specified target loudness parameter;

generate a file comprising audio data processed to satisfy one or more of the target parameters; and provide the file generated using the processed audio data to one or more destinations.

2. The system as defined in claim 1, wherein the system is configured to identify and merge adjacent audio segments within a threshold range of loudness of each other.

3. The system as defined in claim 1, wherein the system is configured to measure audio levels of a given non-speech segment in a backward direction and a forward direction for a corresponding amount of time, and in response to determining that, at a given location in the given non-speech segment, a loudness of the audio levels in the backward direction and a loudness of the audio levels in the forward direction have greater than a threshold difference in loudness, mark a change point.

4. The system as defined in claim 1, wherein the one or more dynamics audio processors comprises an upward expander, a compressor, and a limiter wherein the system is configured to dynamically adjust a threshold of the upward expander, and/or a threshold of the compressor.

5. The system as defined in claim 1, wherein the one or more dynamics audio processors comprises an upward expander, a compressor, and/or a limiter.

6. The system as defined in claim 1, wherein the system is configured to perform transcoding, dithering and/or noise shaping on the audio data processed to satisfy the target parameters.

7. The system as defined in claim 1, wherein the system is configured to calculate an integrated loudness for a given speech segment.

8. The system as defined in claim 1, wherein the system is configured to detect peak volume levels in a given audio segment less than or equal to a corresponding threshold value, and in response to detecting peak volume levels in a given audio segment less than or equal to the corresponding threshold value, classify the given audio segment as a non-speech segment.

9. The system as defined in claim 1, wherein the system is configured to evaluate peak level measurements and perform error correction of speech probabilities based at least in part on a bit rate of the audio data.

10. The system as defined in claim 1, wherein the target parameters comprise integrated loudness, short time loudness, momentary loudness, true peak, audio file format information, audio codec, number of audio channels, bit depth, bit rate and/or sample rate.

11. The system as defined in claim 1, wherein the deliverables specify at least: one or more distribution platforms and/or codecs.

12. The system as defined in claim 1, wherein the system is configured to calculate a volume RMS of the received audio to determine a gain needed to reach the first specified target level, wherein the calculation excludes near silence and silence in the received audio.

13. The system as defined in claim 1, wherein the system is configured to dynamically update one or more target parameters.

14. The system as defined in claim 1, wherein the given audio segment associated with the speech indicator comprises both non-speech content and speech content.

15. A computer implemented method comprising:

accessing audio data;

receiving an identification of specified deliverables;

accessing metadata corresponding to the specified deliverables, the metadata specifying target parameters including at least specified target loudness parameters;

performing loudness measurements on the audio data;

obtaining a likelihood that speech audio is present in a given portion of the audio data and identify a corresponding time duration;

determining if the likelihood of speech being present within the given portion of the audio data satisfies a first threshold;

at least partly in response to determining that the likelihood of speech being present within the given portion of the audio data satisfies the first threshold and that the corresponding time duration satisfies a second threshold, associating a speech indicator with the given portion of the audio data;

identifying and resolving non-immutable change point indicators that are within a threshold period of time of each other, wherein resolving non-immutable change point indicators comprises a change point modification, wherein if a given pair of change point indicators are marked as immutable, indicating that a duration of non-speech between the pair of change point indicators is greater than a specified threshold, the change point modification is inhibited with respect to the given pair of change point indicators marked as immutable;

based at least in part on the loudness measurements, associating a given portion of the audio data with a pair of change point indicators that indicate a short term change in loudness that satisfies a third threshold, the pair of change point indicators defining an audio segment;

determining a gain needed to reach an interim target audio level for the given audio segment associated with the speech indicator;

using the determined gain needed to reach the interim target audio level to perform volume leveling on the given audio segment to thereby provide a volume-leveled given audio segment;

using one or more dynamics audio processors to process the volume-leveled given audio segment to satisfy one or more of the target parameters, including at least a specified target loudness parameter;

generating a file comprising audio data processed to satisfy one or more of the target parameters; and providing the file generated using the processed audio data to one or more destinations.

16. The method as defined in claim 15, the method further comprising identifying and merging adjacent audio segments within a threshold range of loudness of each other.

17. The method as defined in claim 15, the method further comprising measuring audio levels of a given non-speech segment in a backward direction and a forward direction for a corresponding amount of time, and in response to determining that, at a given location in the given non-speech segment, a loudness of the audio levels in the backward direction and a loudness of the audio levels in the forward direction have greater than a threshold difference in loudness, marking a change point.

18. The method as defined in claim 15, wherein the one or more dynamics audio processors comprises an upward expander, a compressor, and a limiter the method further comprising dynamically adjusting a threshold of the upward expander, and/or a threshold of the compressor.

19. The method as defined in claim 15, wherein the one or more dynamics audio processors comprises an upward expander, a compressor, and/or a limiter.

20. The method as defined in claim 15, the method further comprising performing transcoding, dithering and/or noise shaping on the audio data processed to satisfy the target parameters.

21. The method as defined in claim 15, the method further comprising calculating an integrated loudness for a given speech segment.

22. The method as defined in claim 15, the method further comprising detecting peak volume levels in a given audio segment less than or equal to a corresponding threshold value, and in response to detecting peak volume levels in a given audio segment less than or equal to the corresponding threshold value, classifying the given audio segment as a non-speech segment.

23. The method as defined in claim 15, the method further comprising evaluating peak level measurements and performing error correction of speech probabilities based at least in part on a bit rate of the audio data.

24. The method as defined in claim 15, wherein the target parameters comprise integrated loudness, short time loudness, momentary loudness, true peak, audio file format information, audio codec, number of audio channels, bit depth, bit rate and/or sample rate.

25. The method as defined in claim 15, wherein the deliverables specify at least: one or more distribution platforms and/or codecs.

26. The method as defined in claim 15, the method further comprising calculating a volume RMS of the received audio to determine a gain needed to reach the first specified target level, wherein the calculation excludes near silence and silence in the received audio.

27. The method as defined in claim 15, the method further comprising dynamically updating one or more target parameters.

28. The method as defined in claim 15, wherein the given audio segment associated with the speech indicator comprises both non-speech content and speech content.

* * * * *